(12) United States Patent
Hayashi et al.

(10) Patent No.: US 11,926,230 B2
(45) Date of Patent: Mar. 12, 2024

(54) ROBOT CHARGING STATION

(71) Applicant: GROOVE X, INC., Tokyo (JP)

(72) Inventors: Kaname Hayashi, Tokyo (JP); Daijiro Kato, Tokyo (JP); Tomoaki Yokoyama, Tokyo (JP); Yuichi Onda, Tokyo (JP); Naoshi Hatori, Tokyo (JP)

(73) Assignee: GROOVE X, INC., Tokyo (JP)

( * ) Notice: Subject to any disclaimer, the term of this patent is extended or adjusted under 35 U.S.C. 154(b) by 276 days.

(21) Appl. No.: 17/337,362

(22) Filed: Jun. 2, 2021

(65) Prior Publication Data

US 2021/0291677 A1 Sep. 23, 2021

Related U.S. Application Data

(63) Continuation of application No. PCT/JP2019/047116, filed on Dec. 3, 2019.

(30) Foreign Application Priority Data

Dec. 3, 2018 (JP) ................................ 2018-226517

(51) Int. Cl.
*B60L 53/30* (2019.01)
*B60L 53/16* (2019.01)

(52) U.S. Cl.
CPC ............... *B60L 53/30* (2019.02); *B60L 53/16* (2019.02)

(58) Field of Classification Search
CPC ................................. B60L 53/30; B60L 53/16
USPC ........................................................ 320/109
See application file for complete search history.

(56) References Cited

U.S. PATENT DOCUMENTS

| 6,565,371 | B1 | 5/2003 | Watanabe |
| 6,764,373 | B1 | 7/2004 | Osawa et al. |
| 8,106,626 | B2* | 1/2012 | Li .......................... B60L 53/30 |
| | | | 320/109 |
| 8,369,989 | B2* | 2/2013 | Sip ....................... B25J 19/005 |
| | | | 901/50 |

(Continued)

FOREIGN PATENT DOCUMENTS

| CN | 1610208 A | * | 4/2005 | ............... A47L 9/00 |
| CN | 1660007 A | | 8/2005 | |

(Continued)

OTHER PUBLICATIONS

International Search Report in PCT/JP2019/047116, dated Feb. 4, 2020. 4pp.

(Continued)

*Primary Examiner* — Suresh Memula
(74) *Attorney, Agent, or Firm* — HAUPTMAN HAM, LLP

(57) ABSTRACT

Ease of connecting to a robot in a charging station is increased. A charging station includes a base having an upper face up on which a wheel rides, and a power supply terminal to be connected to a charging terminal of a robot. The upper face of the base is such that a target position is set in a far side region, while a reference entrance line that connects an entrance side specific position and the target position is set, and the upper face of the base includes an inverted face of a three-dimensional curved form that provides an entering wheel with a gravitational component that acts toward the reference entrance line side. The power supply terminal is connected to the charging terminal in a state wherein the wheel has arrived at the target position.

19 Claims, 20 Drawing Sheets

(56) References Cited

U.S. PATENT DOCUMENTS

| | | | |
|---|---|---|---|
| 10,243,379 B1* | 3/2019 | Kwa | B60L 53/16 |
| 2002/0153185 A1 | 10/2002 | Song et al. | |
| 2005/0156562 A1* | 7/2005 | Cohen | B25J 9/1664 320/107 |
| 2009/0121673 A1 | 5/2009 | Nakayama et al. | |
| 2009/0228165 A1* | 9/2009 | Ozick | G05D 1/0225 320/137 |
| 2009/0315501 A1* | 12/2009 | Li | B25J 19/005 901/1 |
| 2009/0315511 A1* | 12/2009 | Lai | H01M 10/48 320/162 |
| 2009/0322282 A1* | 12/2009 | Chu | B25J 19/005 320/109 |
| 2010/0026239 A1* | 2/2010 | Li | H02J 7/0044 320/109 |
| 2013/0006446 A1* | 1/2013 | Kim | A47L 9/009 14/71.1 |
| 2013/0221908 A1* | 8/2013 | Tang | H02J 7/0042 320/107 |
| 2014/0100736 A1* | 4/2014 | Kim | G05D 1/0219 15/49.1 |
| 2015/0270729 A1 | 9/2015 | Isobe | |
| 2015/0314453 A1* | 11/2015 | Witelson | H02J 50/10 241/101.5 |
| 2017/0153638 A1 | 6/2017 | Kawamura et al. | |
| 2018/0333862 A1 | 11/2018 | Hayashi | |
| 2019/0059680 A1* | 2/2019 | Fox | A47L 11/4091 |
| 2019/0181666 A1 | 6/2019 | Hayashi | |
| 2019/0380552 A1* | 12/2019 | Han | G05D 1/0225 |
| 2020/0021122 A1* | 1/2020 | Lydon | H02J 7/0044 |
| 2020/0133287 A1* | 4/2020 | Wendeborn | G05D 1/0225 |
| 2021/0302967 A1* | 9/2021 | Ko | G01S 13/878 |
| 2022/0219557 A1* | 7/2022 | Poluboiarinov | B60L 53/36 |

FOREIGN PATENT DOCUMENTS

| | | | | |
|---|---|---|---|---|
| CN | 2768861 Y | * | 4/2006 | |
| CN | 101648377 A | | 2/2010 | |
| CN | 107053121 A | | 8/2017 | |
| CN | 113263949 A | * | 8/2021 | B60L 53/30 |
| CN | 114156989 A | * | 3/2022 | |
| CN | 217852784 U | * | 11/2022 | A47L 11/4025 |
| DE | 102018001503 A1 | * | 8/2018 | |
| EP | 2656718 A1 | * | 10/2013 | A01D 34/008 |
| EP | 2960100 A2 | * | 12/2015 | B60L 53/16 |
| JP | 2000323219 A | | 11/2000 | |
| JP | 2001125641 A | | 5/2001 | |
| JP | 2006204758 A | | 8/2006 | |
| JP | 2006231448 A | | 9/2006 | |
| JP | 2008-193820 | * | 8/2008 | |
| JP | 2008193820 A | | 8/2008 | |
| JP | 2009113181 A | | 5/2009 | |
| JP | 2009238055 A | | 10/2009 | |
| JP | 2015186319 A | | 10/2015 | |
| KR | 20020080896 A | | 10/2002 | |
| KR | 102032516 B1 | * | 10/2019 | |
| KR | 20190142062 A | * | 12/2019 | |
| KR | 102419528 B1 | * | 7/2022 | |
| WO | WO-2016096194 A1 | * | 6/2016 | B60L 11/1835 |
| WO | 2017169826 A1 | | 10/2017 | |
| WO | 2018052001 A1 | | 3/2018 | |
| WO | WO-2020116412 A1 | * | 6/2020 | B60L 53/16 |
| WO | WO-2020171317 A1 | * | 8/2020 | B25J 9/1602 |

OTHER PUBLICATIONS

Office Action in CN Application No. 201980079666.1, dated Nov. 21, 2023. 16pp.

* cited by examiner

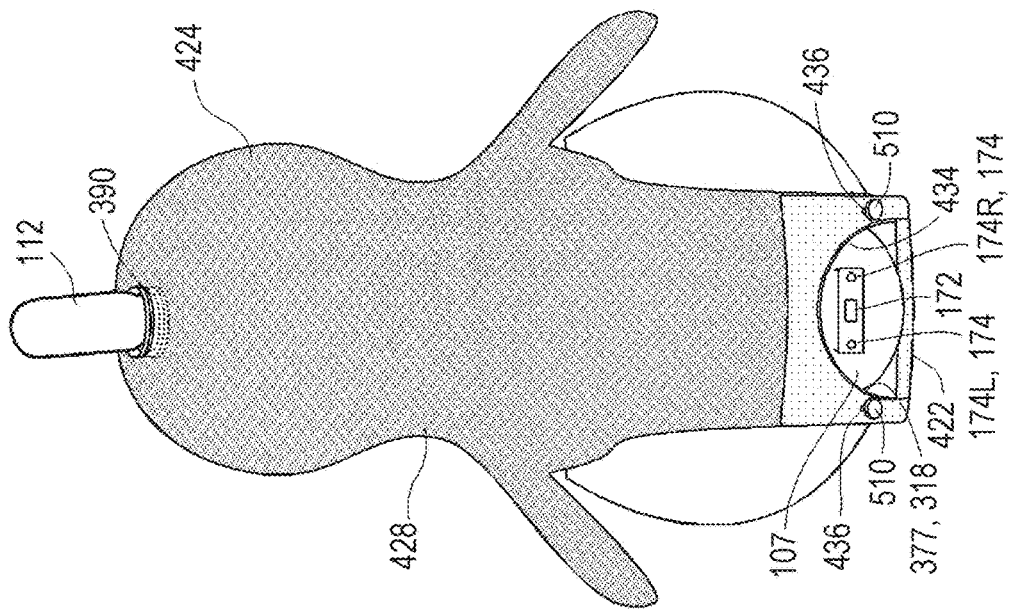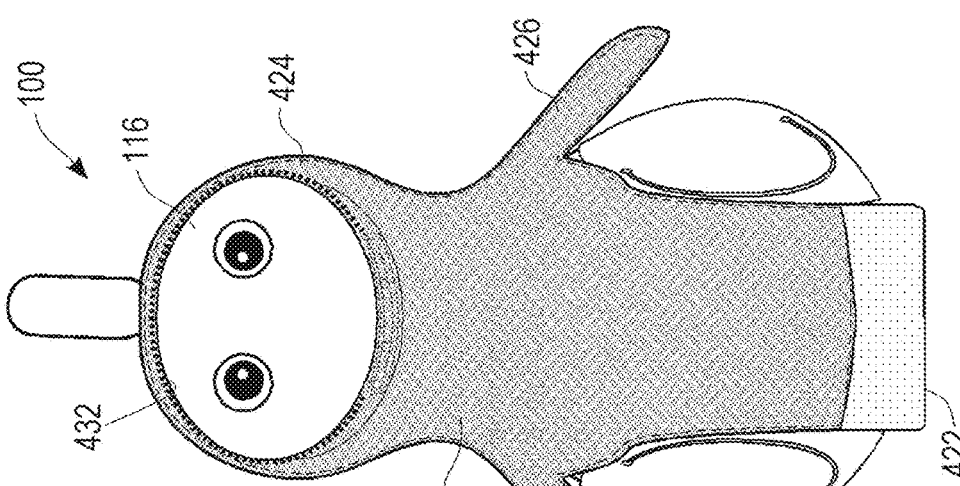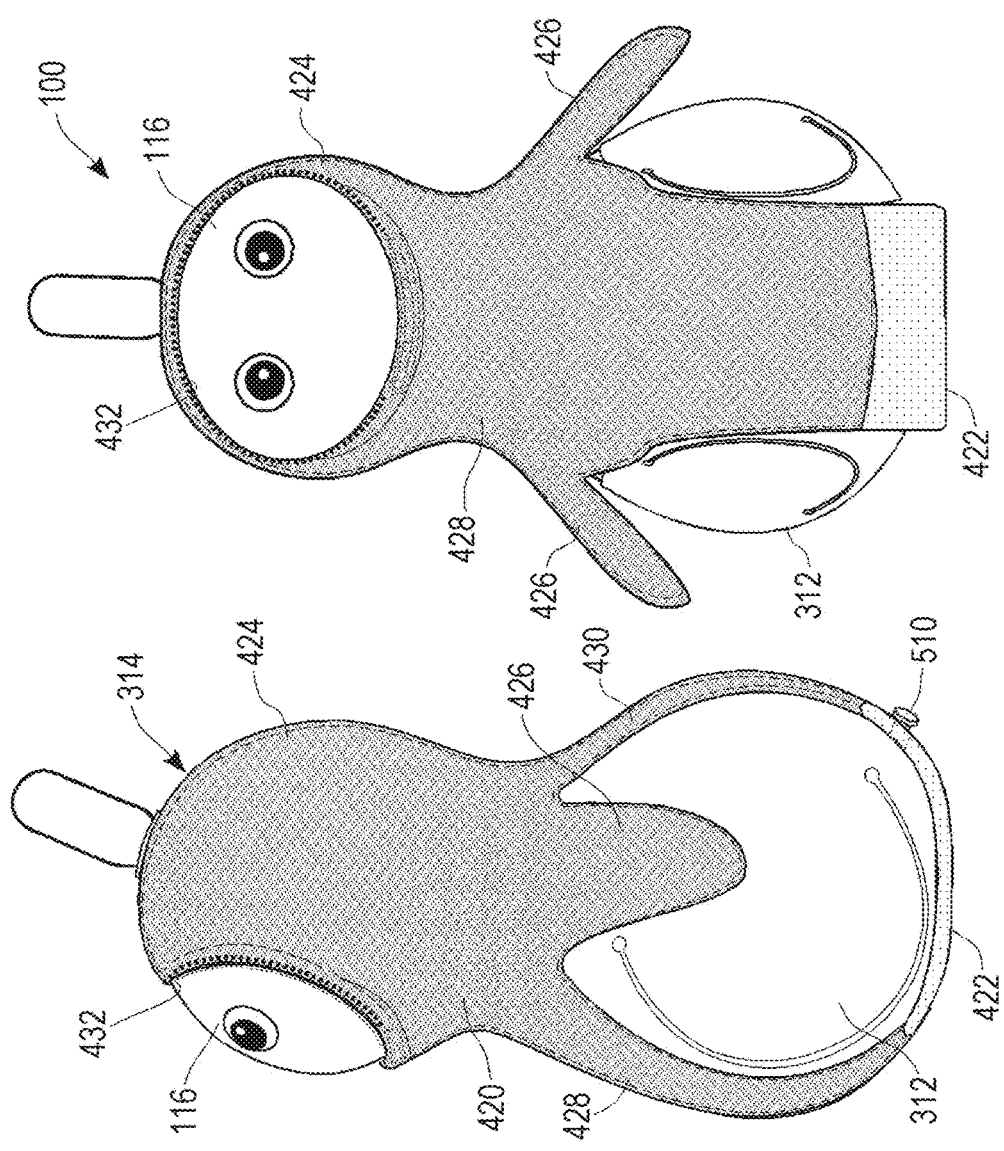

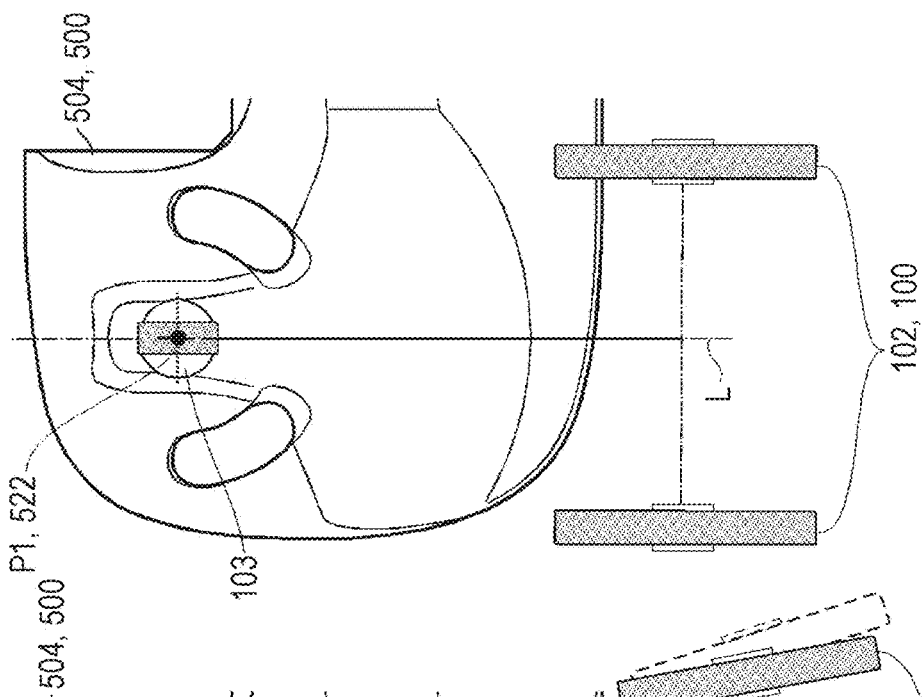
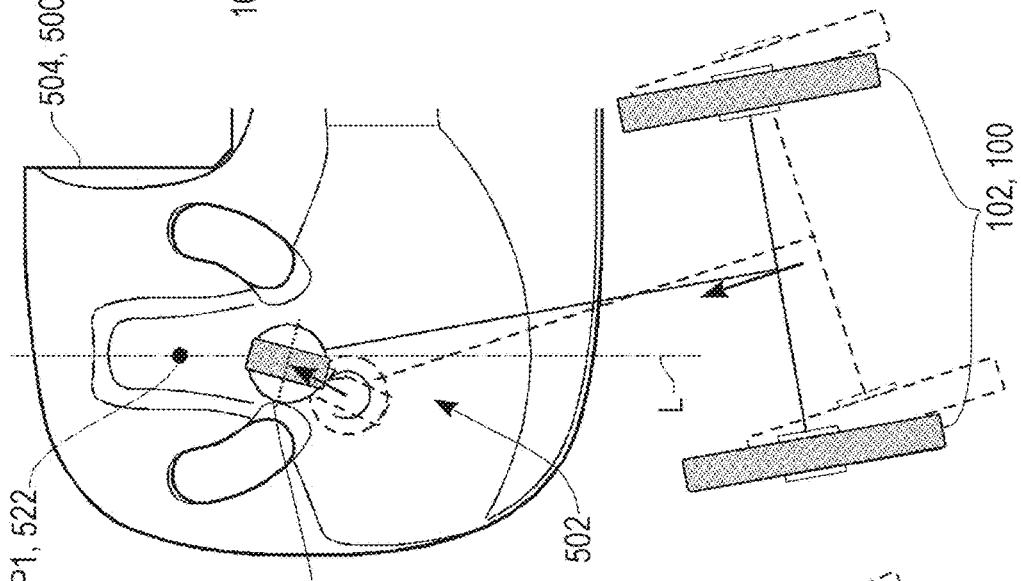
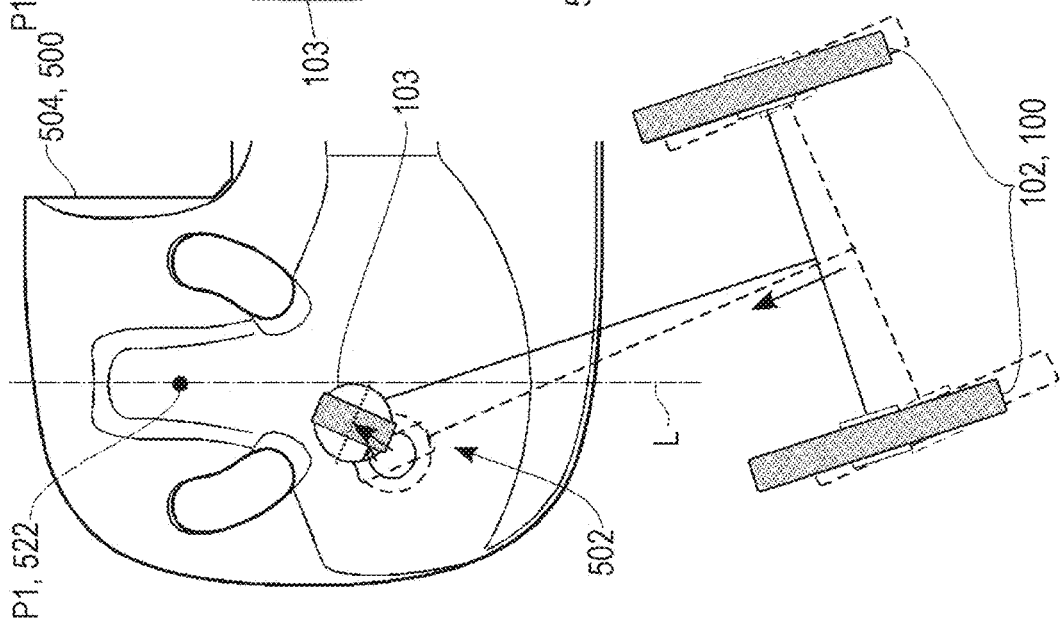

ROBOT CHARGING STATION

CROSS-REFERENCE TO RELATED APPLICATIONS

The present application is a continuation of International Application No. PCT/JP2019/047116, filed Dec. 3, 2019, which claims priority from Japanese Application No. 2018-226517, filed Dec. 3, 2018, the disclosures of which applications are hereby incorporated by reference herein in their entirety.

BACKGROUND OF THE INVENTION

1. Field of the Invention

The present invention relates to a charging station for carrying out charging of a robot.

2. Description of the Background Art

Development of an autonomously acting robot that provides a human with dialog and solace, such as a humanoid robot or a pet robot, is advancing (refer to JP-A-2000-323219). As this kind of robot, a robot that causes behavior to evolve by learning autonomously based on a peripheral situation, thereby creating an impression of life, is in the process of emerging (refer to International Publication WO 2017/169826).

As this kind of robot also operates using electrical energy, charging is necessary. Because of this, technology such that a robot can carry out communication with a charging station, and the robot is induced to go to the station when a remaining charge drops to or below a reference value, and caused to charge autonomously has been proposed (refer to JP-A-2001-125641).

However, unless the robot is caused to enter a set position in the station at a correct angle, terminals of the robot and the station cannot be connected. When the robot is a wheel-driven robot in particular, precise robot movement control is needed, such as several switches of direction being needed when nearing the station. Because of this, there is a problem in that a process load increases, and time is needed.

SUMMARY OF THE INVENTION

The invention, having been contrived based on a recognition of the heretofore described problem, has a main object of increasing ease of connection with a robot in a charging station.

One aspect of the invention is a charging station for carrying out a charging of a robot that travels on a wheel. The charging station includes a base having an upper face up on which the wheel rides, and a power supply terminal to be connected to a charging terminal of the robot. The upper face of the base is such that a target position is set in a far side region, while a reference entrance line that connects an entrance side specific position and the target position is set, and the upper face of the base includes an inverted face of a three-dimensional curved form that provides an entering wheel with a gravitational component that acts toward the reference entrance line side. The power supply terminal is connected to the charging terminal in a state wherein the wheel has arrived at the target position.

According to the charging station of the invention, ease of connecting a robot can be increased.

BRIEF DESCRIPTION OF THE DRAWINGS

The heretofore described object, and other objects, characteristics, and advantages, will be further clarified by a preferred embodiment described hereafter, and by the following accompanying drawings.

FIG. 8A is a right side view representing a state wherein an outer skin is mounted on the robot;

FIG. 8B is a front view representing a state wherein the outer skin is mounted on the robot;

FIG. 8C is a back view representing a state wherein the outer skin is mounted on the robot;

FIG. 18A is a schematic view showing an example of a wheel guiding mechanism, and is a drawing showing a wheel guiding process in planar view;

FIG. 18B is a schematic view showing an example of the wheel guiding mechanism, and is a drawing showing the wheel guiding process in planar view;

FIG. 18C is a schematic view showing an example of the wheel guiding mechanism, and is a drawing showing the wheel guiding process in planar view;

DETAILED DESCRIPTION OF THE INVENTION

Figure 1:
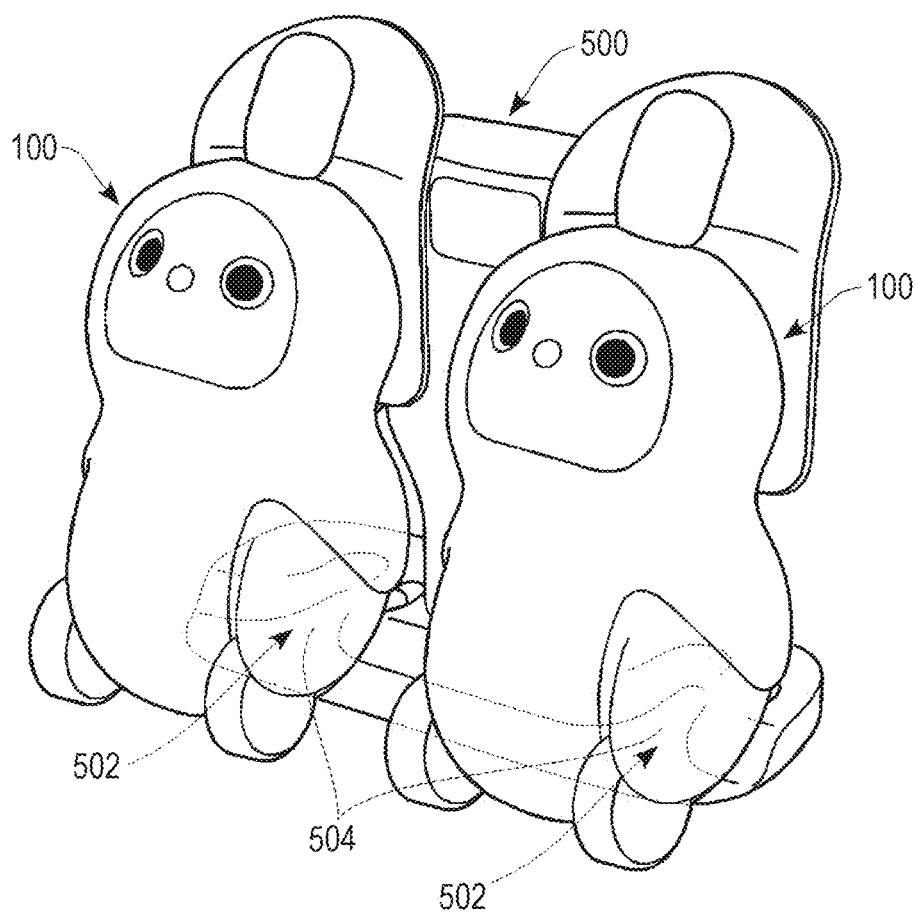
FIG. 1 is a drawing for describing an outline of a robot charging system.

Hereafter, an embodiment of the invention will be described in detail, with reference to the drawings. For the sake of convenience, a positional relationship between structures may be expressed in the following description with a situation shown in the drawings as a reference. Also, the same reference signs will be allotted to components that are practically identical in the following embodiment and modifications thereof, and a description thereof will be omitted as appropriate.

FIG. 1 is a drawing for describing an outline of a robot charging system 10.

The charging system 10 includes a charging station (hereafter called simply "station") 500 that can charge two robots 100 simultaneously. The robot 100 is an autonomously acting robot of a type that travels on wheels. The robot 100 includes two front wheels and one rear wheel. The left and right front wheels are drive wheels, and the rear wheel is a driven wheel formed of a caster (details will be described hereafter).

The station 500 plays the role of a nest (a bed) of a multiple of robots 100. Two charging spaces 502 are disposed side-by-side in proximity in order that two robots 100 can be charged neighboring each other in a friendly fashion. The robot 100 returns to the nest for charging, and demonstrates its cuteness to a periphery by facing forward during charging. Because of this, the robot 100 enters the charging space 502 backward. That is, the caster is leading at the time of entering.

A base 504 upon which the caster rises is provided in the charging space 502. By the caster arriving in a target position on the base 504, a power supply terminal of the station 500 and a charging terminal of the robot 100 are stably connected, and charging can be carried out. In the embodiment, inertia accompanying a movement of the robot 100 and a gravitational force of the caster are utilized in order to cause the caster to arrive in the target position easily and efficiently. That is, an upper face of the base 504 includes an inclined face of a three-dimensional curved form for providing the entering caster with a gravitational force component that acts toward the target position. Although the caster has a 360 degree freedom of turn, the caster cannot turn by itself. Therefore, a configuration is such that the caster turns in the direction of the gravitational force component in the process of rolling over the inclined face of the three-dimensional curved form, and can be naturally guided to the target position. Hereafter, specific configurations of the robot 100 and the station 500 that realize this kind of guiding will be described.

Figure 2A:
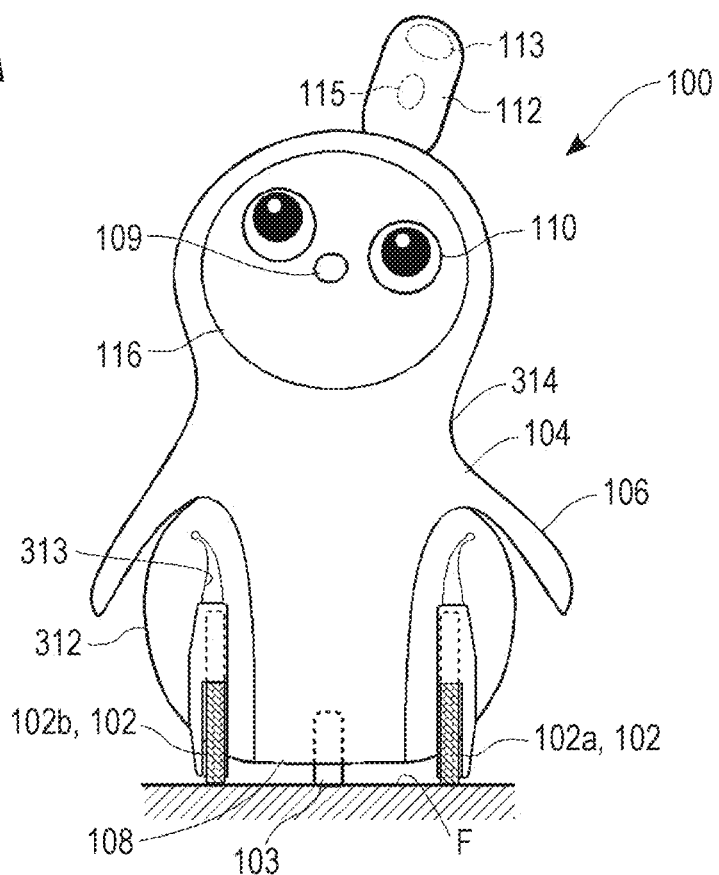
FIG. 2A is a front view representing an external view of a robot.
Figure 2B:
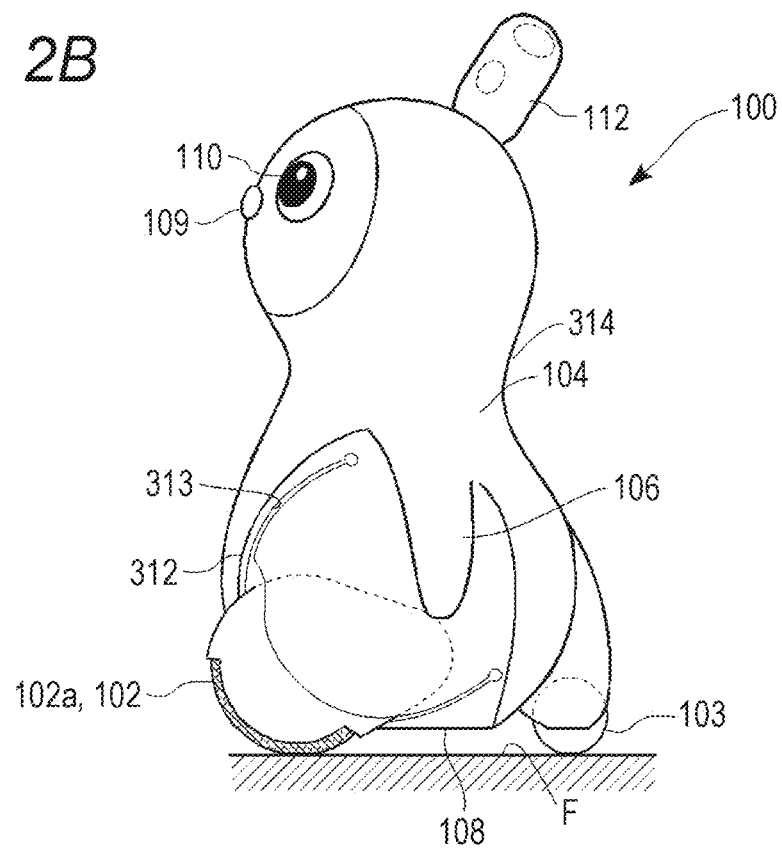
FIG. 2B is a side view representing an external view of the robot.

Basic Configuration FIGS. 2A and 2B are drawings representing an external view of the robot 100. FIG. 2A is a front external view, and FIG. 2B is a side external view.

The robot 100 is an autonomously acting robot that fixes an action based on an external environment and an internal state. The external environment is recognized by various kinds of sensor such as a camera or a thermosensor. The internal state is quantified as various parameters that express emotions of the robot 100. The robot 100 has an inside of an owner's home as a range of action. Hereafter, a human who is involved with the robot 100 will be called a "user".

A body 104 of the robot 100 has a rounded form all over, and includes an outer skin 314 formed of a soft material having elasticity, such as urethane rubber, a resin, or a fiber. The robot 100 may also be dressed in clothes. A total weight of the robot 100 is in the region of 5 to 15 kilograms, and a height is in the region of 0.5 to 1.2 meters. Owing to the attributes of appropriate weight, roundness, softness, and a pleasant tactile sensation, advantages are realized in that a user can easily hug the robot 100, and feels a desire to hug the robot 100.

The robot 100 includes a pair of front wheels 102 (a left wheel 102a and a right wheel 102b) and one rear wheel 103. The front wheels 102 are drive wheels, and the rear wheel 103 is a driven wheel. Although the front wheels 102 have no steering mechanism, rotational speed and a direction of rotation of the left and right wheels can be individually controlled. The rear wheel 103 is a caster, and rotates freely in order to cause the robot 100 to move forward and back, and left and right. The rear wheel 103 may also be an omni wheel. By controlling in such a way that the rotational speed of the right wheel 102b is greater than that of the left wheel 102a, the robot 100 can turn left or rotate counterclockwise. By controlling in such a way that the rotational speed of the left wheel 102a is greater than that of the right wheel 102b, the robot 100 can turn right or rotate clockwise.

The front wheels 102 and the rear wheel 103 can be completely housed in the body 104 using a drive mechanism (a pivoting mechanism or a linking mechanism). A left and right pair of covers 312 are provided in a lower half portion of the body 104. The cover 312 is formed of a resin material (rubber, silicone rubber, or the like) having flexibility and elasticity, configures a soft trunk, and can house the front wheel 102. A slit 313 (an aperture portion) that opens from a side face to a front face is formed in the cover 312, and the front wheel 102 can be caused to advance through the slit 313, thereby being exposed to an exterior.

A greater portion of each wheel is hidden by the body 104 when traveling too, but when each wheel is completely housed in the body 104, the robot 100 is in a state of being unable to move. That is, the body 104 descends, and sits on a floor surface F, in accompaniment to an operation of the wheels being housed. In the sitting state, a flat seating face 108 (a grounding bottom face) formed in a bottom portion of the body 104 comes into contact with the floor surface F.

The robot 100 has two arms 106. There is a hand at a leading end of the arm 106, but there is no function of gripping an object. The arm 106 is capable of simple actions such as raising, bending, waving a hand, and oscillating using a drive of an actuator to be described hereafter. The two arms 106 can be individually controlled.

A facial region 116 is exposed in a front face of a head portion of the robot 100. Two eyes 110 are provided in the facial region 116. An image can be displayed in the eye 110 using a liquid crystal element or an organic EL element. A nose 109 is provided in a center of the facial region 116. An analog stick is provided in the nose 109, and in addition to all of up, down, left, and right directions, a pressing direction can also be detected. Also, a multiple of touch sensors are provided in the robot 100, and a touch by a user can be detected in practically all regions of the robot 100, such as the head portion, the trunk portion, a buttock portion, and the arm. Various sensors, such as a microphone array or an ultrasonic wave sensor that can identify a sound source direction, are mounted in the robot 100. Also, the robot 100 incorporates a speaker, and can emit simple speech.

A horn 112 is attached to the head portion of the robot 100. An omnidirectional camera 113 is attached to the horn 112, and can film a whole of a region above the robot 100 at one time. A thermosensor 115 (a thermal imaging camera) is also incorporated in the horn 112. An emergency stop switch is provided in the horn 112, and a user can stop the robot immediately by pulling out the horn 112.

Figure 3:
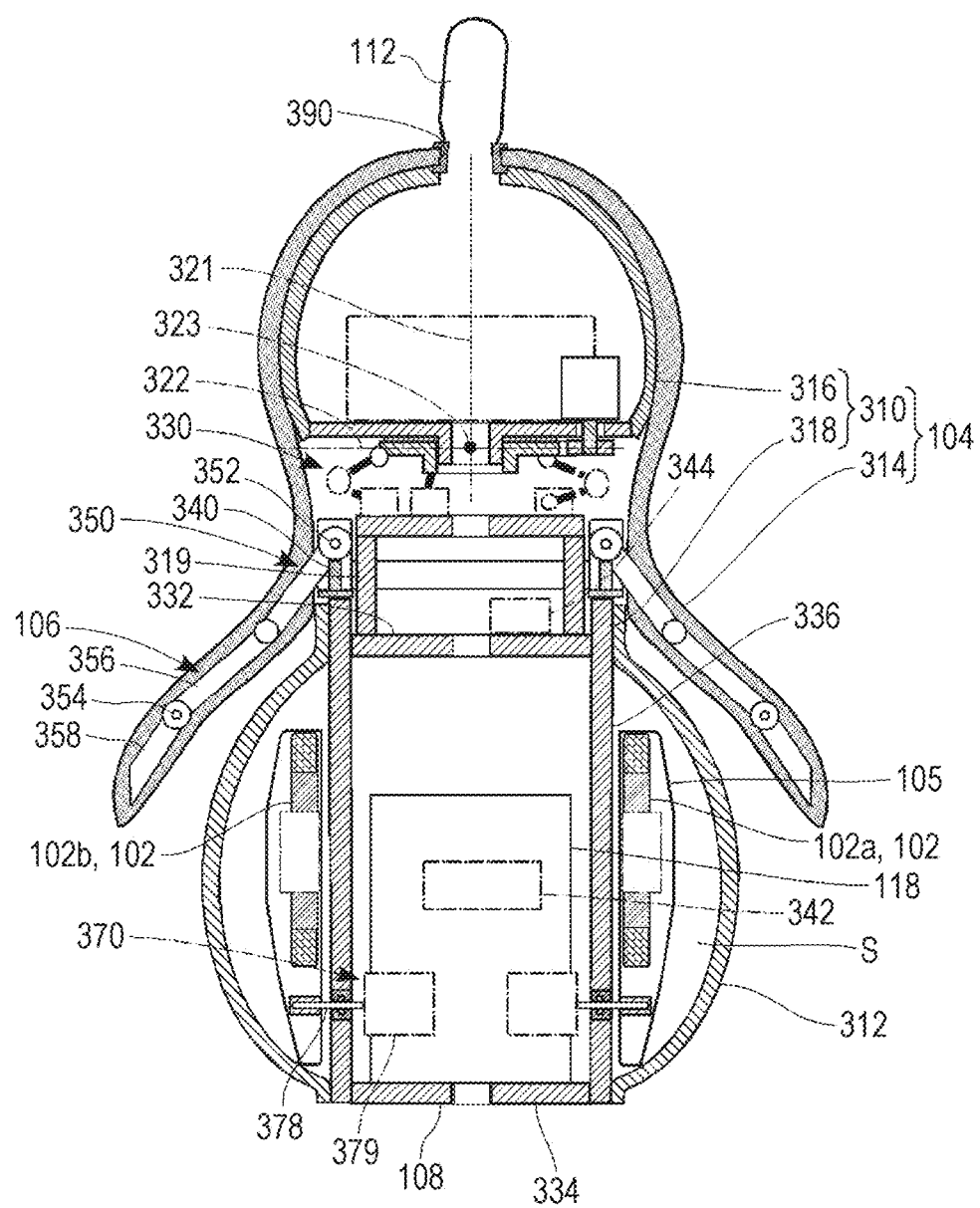
FIG. 3 is a sectional view schematically representing a structure of the robot.

FIG. 3 is a sectional view schematically representing a structure of the robot 100.

The body 104 includes a main body frame 310, the pair of arms 106, the pair of covers 312, and the outer skin 314. The main body frame 310 includes a head portion frame 316 and a trunk portion frame 318. The head portion frame 316 is of a hollow hemispherical form, and forms ahead portion framework of the robot 100. The trunk portion frame 318 is of a rectangular cylindrical form, and forms a trunk portion framework of the robot 100. A lower end portion of the trunk portion frame 318 is fixed to a lower plate 334. The head portion frame 316 is connected to the trunk portion frame 318 via a connecting mechanism 330.

The trunk portion frame 318 configures an axial center of the body 104. The trunk portion frame 318 is configured by a left and right pair of side plates 336 being fixed to the lower plate 334, and supports the pair of arms 106 and an internal mechanism. A battery 118, a control circuit 342, and various kinds of actuator and the like are housed inside the trunk portion frame 318. A bottom face of the lower plate 334 forms the seating face 108.

The trunk portion 318 has an upper plate 332 in an upper portion thereof. A bottomed cylindrical support portion 319 is fixed to the upper plate 332. The upper plate 332, the lower plate 334, the pair of side plates 336, and the support portion 319 configure the trunk portion frame 318. An outer diameter of the support portion 319 is smaller than an interval between the left and right side plates 336. Each of the pair of arms 106 configures an arm unit 350 by being assembled integrated with an annular member 340. The annular member 340 forms a circle, and the pair of arms 106 are attached in such a way as to separate in a radial direction along a central line of the annular member 340. The annular member 340 is coaxially fitted over the support portion 319, and placed on upper end faces of the pair of side plates 336. The arm unit 350 is supported from below by the trunk portion frame 318.

The head portion frame 316 has a yaw shaft 321, a pitch shaft 322, and a roll shaft 323. A head shaking action is realized by a pivoting (yawing) of the head portion frame 316 around the yaw shaft 321, a nodding action, a looking up action, and a looking down action are realized by a pivoting (pitching) around the pitch shaft 322, and an action of tilting the head left or right is realized by a pivoting (rolling) around the roll shaft 323. A position and angle of each shaft in a three-dimensional space may change in accordance with a drive aspect of the connecting mechanism 330. The connecting mechanism 330 is formed of a linking mechanism, and is driven by a multiple of motors installed in the trunk portion frame 318.

The trunk portion frame 318 houses a wheel drive mechanism 370. The wheel drive mechanism 370 includes a front wheel drive mechanism and a rear wheel drive mechanism that drive the front wheels 102 and the rear wheel 103 respectively out of and into the body 104. The front wheels 102 and the rear wheel 103 function as "movement mechanisms" that cause the robot 100 to move. The front wheel 102 has a direct drive motor in a central portion thereof. Because of this, the left wheel 102a and the right wheel 102b can be driven individually. The front wheel 102 is supported so as to be able to rotate by a wheel cover 105, and the wheel cover 105 is supported so as to be able to pivot by the trunk portion frame 318.

The pair of covers 312 are provided in such a way as to cover the trunk portion frame 318 from left and right, and are of a smooth curved form in order to provide an outline of the body 104 with roundness. A closed space is formed between the trunk portion frame 318 and the cover 312, and the closed space forms a housing space S for the front wheel 102. The rear wheel 103 is housed in a housing space provided in a lower rear of the trunk portion frame 318.

The outer skin 314 covers the main body frame 310 and the pair of arms 106 from an outer side. The outer skin 314 has a thickness of an extent such that a person feels elasticity, and is formed of a material having elasticity, such as urethane sponge. Because of this, a user feels an appropriate softness when hugging the robot 100, and can make natural physical contact, as a person does with a pet. The outer skin 314 is mounted on the main body frame 310 in an aspect such as to cause the cover 312 to be exposed. An aperture portion 390 is provided in an upper end portion of the outer skin 314. The aperture portion 390 is fitted over the horn 112.

A touch sensor is disposed between the main body frame 310 and the outer skin 314. A touch sensor is embedded in the cover 312. Each of these touch sensors is a capacitive sensor, and a touch in practically all regions of the robot 100 is detected. A touch sensor may also be embedded in the outer skin 314, or a touch sensor may be disposed on an inner side of the main body frame 310.

The arm 106 has a first joint 352 and a second joint 354, and has an arm 356 between the two joints, and a hand 358 on a tip of the second joint 354. The first joint 352 corresponds to a shoulder joint, and the second joint 354 corresponds to a wrist joint. A motor is provided in each joint, whereby the arm 356 and the hand 358 are individually driven. A drive mechanism for driving the arm 106 includes the motors and a drive circuit 344 thereof.

Figure 4A:
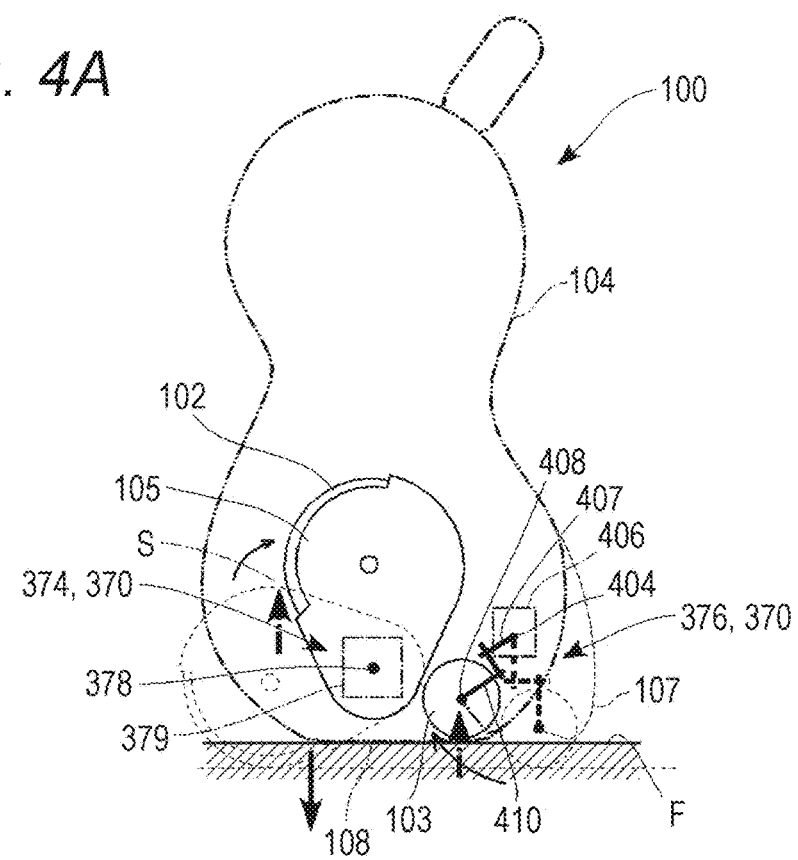
FIG. 4A is a side view schematically showing a structure and an operation of a wheel housing mechanism.
Figure 4B:
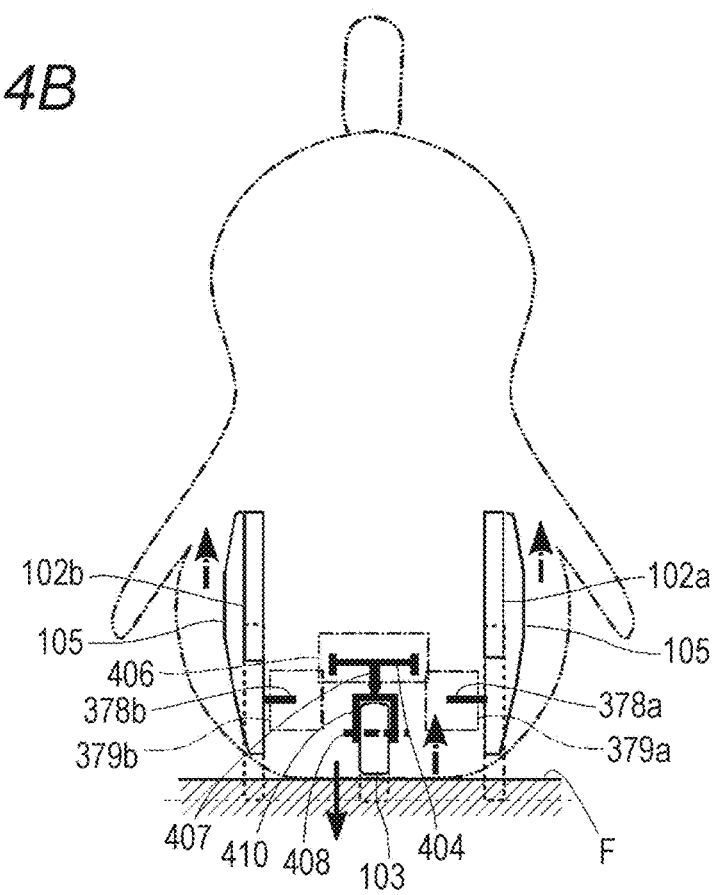
FIG. 4B is a front view schematically showing a structure and an operation of the wheel housing mechanism.

FIGS. 4A and 4B are drawings schematically showing a structure and an operation of a wheel housing mechanism. FIG. 4A is a side view, and FIG. 4B is a front view. A dotted line in the drawings indicates a state wherein a wheel has advanced from the housing space S and can travel, and a solid line in the drawing indicates a state wherein a wheel is housed in the housing space S.

The wheel drive mechanism 370 includes a front wheel drive mechanism 374 and a rear wheel drive mechanism 376. The front wheel drive mechanism 374 includes a pivot shaft 378 and an actuator 379. The pivot shaft 378 is coupled to the wheel cover 105. In the embodiment, a motor is employed as the actuator 379. The front wheel 102 can be driven to reciprocate between the housing space S and the exterior by causing the wheel cover 105 to pivot using a drive of the actuator 379.

In the embodiment, reciprocal drives of the left wheel 102a and the right wheel 102b can be controlled individually. That is, an actuator 379a for the left wheel 102a and an actuator 379b for the right wheel 102b are provided, and each can be driven independently. The wheel cover 105 of the left wheel 102a is connected to the actuator 379a via a pivot shaft 378a, and the wheel cover 105 of the right wheel 102b is connected to the actuator 379b via a pivot shaft 378b. In the following description, the pivot shafts 378a and 378b will be called the "pivot shaft 378" when not particularly distinguishing between the two, and the actuators 379a and 379b will be called the "actuator 379" when not particularly distinguishing between the two.

The rear wheel drive mechanism 376 includes a pivot shaft 404 and an actuator 406. The pivot shaft 404 is provided in parallel with the pivot shaft 378 of the front wheel drive mechanism 374, and supports the rear wheel 103 in such a way that the rear wheel 103 can pivot around an axial line thereof. The rear wheel 103 is a caster, and has a main shaft 407 (a rotary shaft) and an axle 408. A forked arm 410 extends from the main shaft 407, and the axle 408 is provided at leading ends of the arm 410. The wheel is supported in such a way as to be able to rotate by the axle 408. An upper end of the main shaft 407 is connected to a center of the pivot shaft 404, and is supported in such a way as to be able to pivot freely around its own axis. The axle 408 is offset rather than being on the axial line of the main shaft 407. The main shaft 407 causes an orientation (a direction of travel) of the rear wheel 103 to change arbitrarily. The pivot shaft 404 pivots in accordance with a drive by the actuator 406, whereby the rear wheel 103 can be driven to reciprocate between a rear portion housing space and the exterior.

When housing the wheels, the actuators 379 and 406 are driven in one direction. At this time, the wheel cover 105 pivots centered on the pivot shaft 378, and the front wheel 102 rises from the floor surface F. Also, the arm 410 pivots centered on the pivot shaft 404, and the rear wheel 103 rises from the floor surface F (refer to a dashed-dotted line arrow). Because of this, the body 104 descends, the seating face 108 is grounded at the floor surface F (refer to a solid line arrow), and a state in which the robot 100 is sitting is realized. By the actuators 379 and 406 being driven in the opposite direction, each wheel is caused to advance, whereby the robot 100 can be caused to stand.

A rear portion cover 107 resembling a tail is provided on an outer side of the rear wheel 103, and opens and closes a rear portion lower aperture portion of the body 104 in conjunction with an advance or a withdrawal of the rear wheel 103. That is, the rear portion cover 107 operates so as to open when the rear wheel 103 is caused to advance, and the rear portion cover 107 operates so as to close when housing the rear wheel 103.

Figure 5:
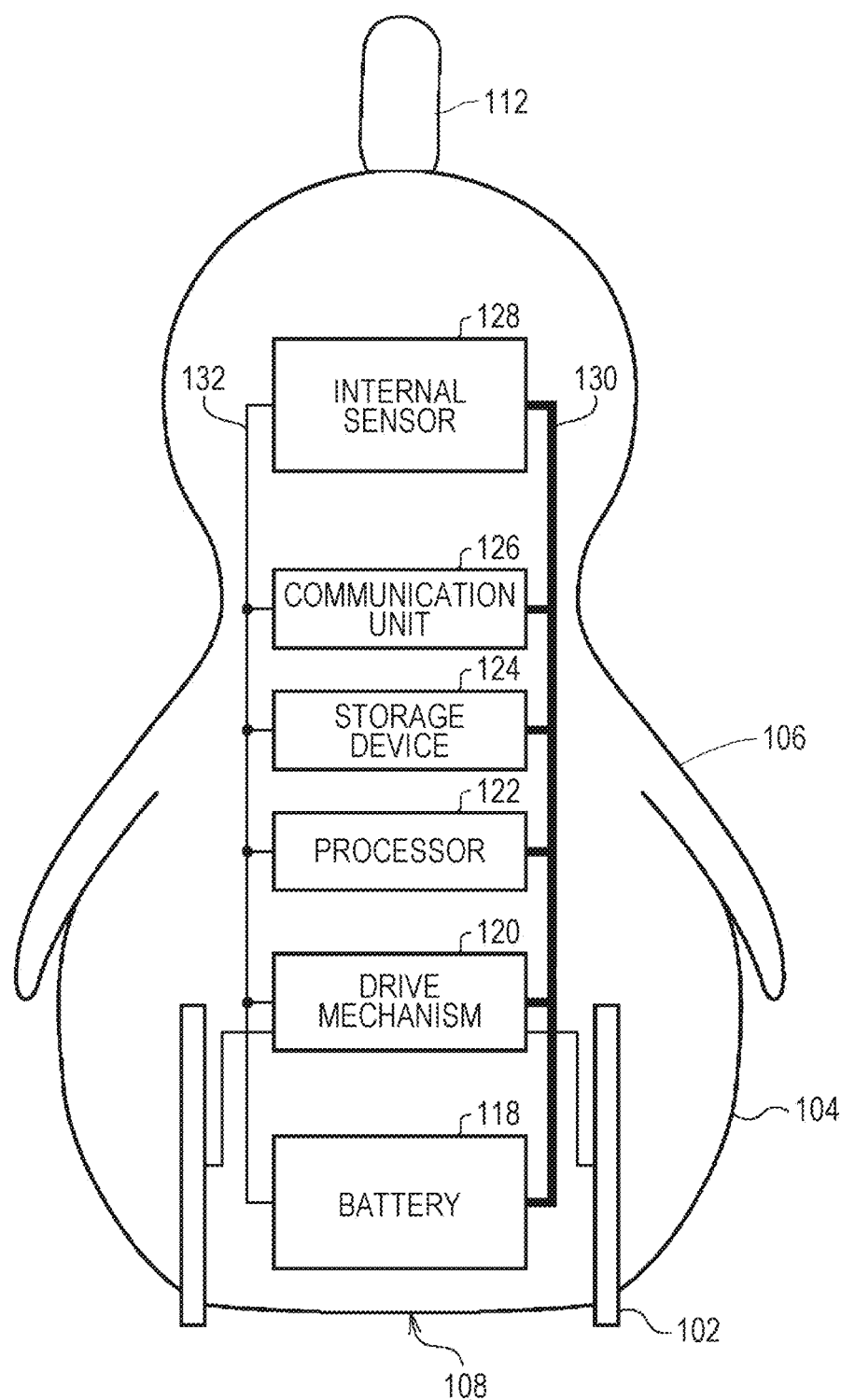
FIG. 5 is a robot hardware configuration drawing.

FIG. 5 is a hardware configuration diagram of the robot 100.

The robot 100 includes an internal sensor 128, a communicator 126, a storage device 124, a processor 122, a drive mechanism 120, and the battery 118. The drive mechanism 120 includes the heretofore described connecting mechanism 330 and wheel drive mechanism 370. The processor 122 and the storage device 124 are included in the control circuit 342. The units are connected to each other by a power line 130 and a signal line 132. The battery 118 supplies power to each unit via the power line 130. Each unit transmits and receives a control signal via the signal line 132. The battery 118 is a lithium ion rechargeable battery, and is a power source of the robot 100.

The internal sensor 128 is a collection of various kinds of sensor incorporated in the robot 100. Specifically, the internal sensor 128 is a camera, a microphone array, a distance measuring sensor (infrared sensor), a thermosensor, a touch sensor, an acceleration sensor, an air pressure sensor, a smell sensor, and the like. The touch sensor is effective in a greater portion of regions of the body 104, and detects a touch by a user based on a change in capacitance. The smell sensor is an already known sensor that applies a principle that electrical resistance changes in accordance with an adsorption of molecules that form a source of a smell.

The communicator 126 is a communication module that carries out wireless communication with various kinds of external device as a target. The storage device 124 is configured of a non-volatile memory and a volatile memory, and stores a computer program and various kinds of setting information. The processor 122 is means of executing a computer program. The drive mechanism 120 includes a multiple of actuators. In addition to this, an indicator, a speaker, and the like are also mounted.

The drive mechanism 120 mainly controls the wheels and the head portion. The drive mechanism 120 causes a direction of movement and a movement speed of the robot 100 to change, and can also cause the wheels to rise and descend. When the wheels rise, the wheels are completely housed in the body 104, and the robot 100 comes into contact with the floor surface F via the seating face 108, taking on the sitting state. Also, the drive mechanism 120 controls the arm 106.

Figure 6:
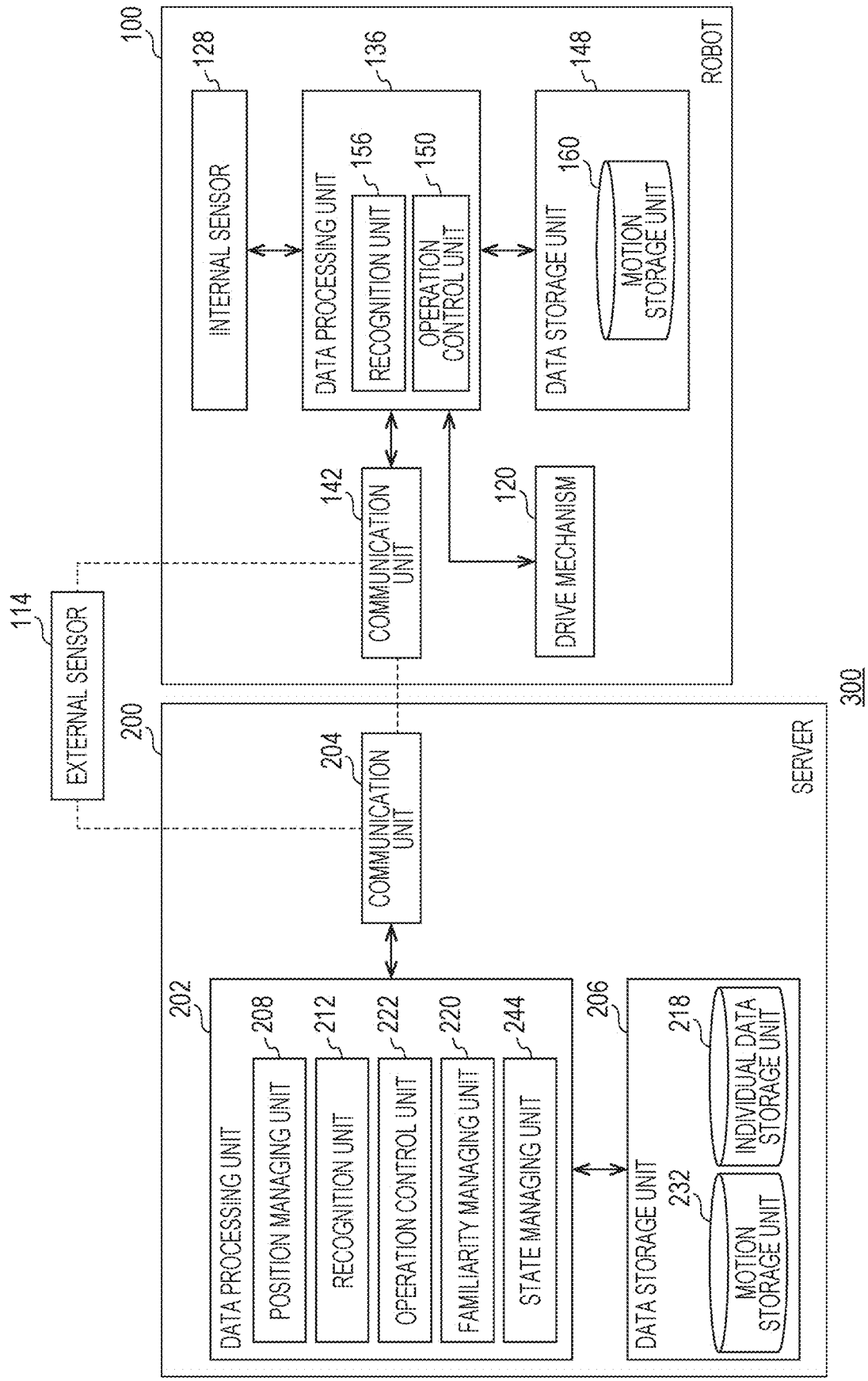
FIG. 6 is a functional block diagram of a robot system.

FIG. 6 is a functional block diagram of a robot system 300.

The robot system 300 includes the robot 100, a server 200, and a multiple of external sensors 114. Each component of the robot 100 and the server 200 is realized by hardware including a computer formed of a central processing unit (CPU), various kinds of coprocessor, and the like, a storage device that is a memory or storage, and a wired or wireless communication line that links the computer and the storage device, and software that is stored in the storage device and supplies a processing command to the computer. A computer program may be configured of a device driver, an operating system, various kinds of application program positioned in an upper layer thereof, and a library that provides a common function to the programs. Each block described hereafter indicates a functional unit block rather than a hardware unit configuration. One portion of the functions of the robot 100 may be realized by the server 200, and one portion or all of the functions of the server 200 may be realized by the robot 100.

The multiple of external sensors 114 are installed in advance in a house. The server 200 manages the external sensor 114, and provides the robot 100 as necessary with a detected value acquired using the external sensor 114. The robot 100 fixes a basic action based on information obtained from the internal sensor 128 and the multiple of external sensors 114. The external sensor 114 is for reinforcing a sensory organ of the robot 100, and the server 200 is for reinforcing a processing capacity of the robot 100. The communicator 126 of the robot 100 regularly communicates with the server 200, and the server 200 may assume responsibility for a process of identifying a position of the robot 100 using the external sensor 114 (refer to International Publication WO 2017/169826).

Server 200

The server 200 includes a communication unit 204, a data processing unit 202, and a data storage unit 206. The communication unit 204 manages a process of communicating with the external sensor 114 and the robot 100. The data storage unit 206 stores various kinds of data. The data processing unit 202 executes various kinds of process based on data acquired by the communication unit 204 and data stored in the data storage unit 206. The data processing unit 202 also functions as an interface between the communication unit 204 and the data storage unit 206.

The data storage unit 206 includes a motion storage unit 232 and an individual data storage unit 218. The robot 100 has a multiple of operation patterns (motions). Various motions, such as waving the arm 106, approaching an owner while meandering, and staring at an owner with the head to one side, are defined.

The motion storage unit 232 stores a "motion file" that defines control details of a motion. Each motion is identified by motion ID. The motion file is also downloaded into a motion storage unit 160 of the robot 100. Which motion is to be executed may be determined by the server 200, or may be determined by the robot 100. Many motions of the robot 100 are configured as compound motions that include a multiple of unit motions.

The individual data storage unit 218 stores information regarding a user. Specifically, the individual data storage unit 218 stores familiarity with respect to a user, and master information indicating physical characteristics and behavioral characteristics of the user. The individual data storage unit 218 may also store other attribute information such as age and gender.

The robot 100 has a familiarity internal parameter for each user. When the robot 100 recognizes an action indicating a liking toward the robot 100, such as picking the robot 100 up or speaking to the robot 100, familiarity with respect to that user increases. Familiarity decreases with respect to a user not involved with the robot 100, a user who behaves roughly, or a user met infrequently.

The data processing unit 202 includes a position managing unit 208, a recognition unit 212, an operation control unit 222, a familiarity managing unit 220, and a state managing unit 244. The position managing unit 208 identifies a position coordinate of the robot 100. The state managing unit 244 manages various kinds of internal parameter, such as various kinds of physical state such as a charging rate, an internal temperature, and a processing load of the processor 122. Also, the state managing unit 244 manages various kinds of emotion parameter that indicate an emotion (loneliness, curiosity, a desire for recognition, and the like) of the robot 100.

The recognition unit 212 recognizes an external environment. Various kinds of recognition, such as recognition of weather or season based on temperature and humidity, and recognition of shelter (a safe area) based on an amount of light and temperature, are included in the recognition of the external environment. A recognition unit 156 of the robot 100 acquires various kinds of environmental information using the internal sensor 128, and transmits the environmental information to the recognition unit 212 of the server 200 after carrying out a primary processing.

Furthermore, the recognition unit 212 determines what person a filmed user corresponds to by comparing a feature vector extracted from an image filmed by the camera incorporated in the robot 100 and a feature vector of a user (cluster) registered in advance in the individual data storage unit 218 (a user identification process). Also, the recognition unit 212 infers an emotion of a user by carrying out image recognition with respect to an expression of the user. The recognition unit 212 also carries out a user identification process with respect to a moving object other than a person, a dog or a cat that is a pet for example.

The recognition unit 212 recognizes various responsive actions performed with respect to the robot 100, and classifies the actions as pleasant or unpleasant actions. Also, the recognition unit 212 recognizes a responsive action of a user with respect to an action of the robot 100, thereby classifying the responsive action as a positive or negative response. Pleasant and unpleasant actions are distinguished depending on whether a responsive action of a user is pleasing or unpleasant for a living being.

The operation control unit 222 fixes a motion of the robot 100 in cooperation with an operation control unit 150 of the robot 100. The operation control unit 222 compiles a movement target point of the robot 100, and a movement route for the movement target point. The operation control unit 222 compiles a multiple of movement routes, and having done so, may select any of the movement routes. The operation control unit 222 selects a motion of the robot 100 from a multiple of motions in the motion storage unit 232.

The familiarity managing unit 220 manages familiarity for each user. Familiarity is registered as one portion of individual data in the individual data storage unit 218. When a pleasant action is detected, the familiarity managing unit 220 increases familiarity with respect to that user. When an unpleasant action is detected, familiarity decreases. Also, familiarity of an owner who has not been visually recognized for a long period gradually decreases.

Robot 100

The robot 100 includes a communication unit 142, a data processing unit 136, a data storage unit 148, the internal sensor 128, and the drive mechanism 120. The communication unit 142 corresponds to the communicator 126 (refer to FIG. 5), and manages a process of communicating with the external sensor 114, the server 200, and another robot 100. The data storage unit 148 stores various kinds of data. The data storage unit 148 corresponds to the storage device 124 (refer to FIG. 5). The data processing unit 136 executes various kinds of process based on data acquired by the communication unit 142 and data stored in the data storage unit 148. The data processing unit 136 corresponds to the processor 122 and a computer program executed by the processor 122. The data processing unit 136 also functions as an interface between the communication unit 142, the internal sensor 128, the drive mechanism 120, and the data storage unit 148.

The data storage unit 148 includes the motion storage unit 160, which defines various kinds of motion of the robot 100. Various kinds of motion file are downloaded from the motion storage unit 232 of the server 200 into the motion storage unit 160. A motion is identified by motion ID. An operating timing, an operating time, an operating direction, and the like, of the various kinds of actuator (the drive mechanism 120) are defined chronologically in a motion file in order to perform various motions, such as housing the wheels and sitting, raising the arm 106, causing the robot 100 to perform a rotating action by causing the two front wheels 102 to rotate in reverse, or by causing only one of the front wheels 102 to rotate, shaking by causing the front wheels 102 to rotate in a state wherein the wheels are housed, or stopping once and looking back when moving away from a user. Various kinds of data may also be downloaded from the individual data storage unit 218.

The data processing unit 136 includes the recognition unit 156 and the operation control unit 150. The recognition unit 156 analyzes external information obtained from the internal sensor 128. The recognition unit 156 is capable of visual recognition (a visual unit), smell recognition (an olfactory unit), sound recognition (an aural unit), and tactile recognition (a tactile unit).

The recognition unit 156 extracts a moving object, in particular an image region corresponding to a person or an animal, from an image, and extracts a "feature vector" as a collection of feature quantities indicating physical characteristics and behavioral characteristics of the moving object from the extracted image region. A feature vector component (feature quantity) is a numeral value wherein a kind of physical or behavioral characteristic is quantified. For example, a width of a human eye is quantified in a range of 0 to 1, forming one feature vector component. A method of extracting a feature vector from a filmed image of a person is an application of already known facial recognition technology. When a moving object is detected, physical characteristics and behavioral characteristics are also extracted from a smell sensor, an incorporated highly directional microphone, a thermosensor, and the like. These characteristics are also quantified, forming a feature vector component. The recognition unit 156 identifies a user from a feature vector based on already known technology described in International Publication WO 2017/169826 and the like. The robot 100 transmits the feature vector to the server 200.

Of a series of recognition processes including detection, analysis, and determination, the recognition unit 156 carries out a selection and an extraction of information necessary for recognition, and an analytical process such as a determination is executed by the recognition unit 212 of the server 200. A recognition process may be carried out by the recognition unit 212 of the server 200 alone, or may be carried out by the recognition unit 156 of the robot 100 alone, or the two may execute the recognition process while dividing roles, as heretofore described. The robot 100 acquires an action of a user as physical information using the internal sensor 128, and the recognition unit 212 of the server 200 determines whether the action is pleasant or unpleasant. Also, the recognition unit 212 of the server 200 executes a user identification process based on a feature vector.

The recognition unit 212 of the server 200 recognizes various kinds of response by a user with respect to the robot 100. "Pleasant" or "unpleasant", and "positive" or "negative", are correlated to one portion of typical responsive actions among various kinds of responsive action. Generally, almost all responsive actions that are pleasant actions are positive reactions, and almost all responsive actions that are unpleasant actions are negative reactions. Pleasant and unpleasant actions are correlated to familiarity, and positive and negative reactions affect an action selection by the robot 100.

The familiarity managing unit 220 of the server 200 changes the familiarity toward a user in accordance with a responsive action recognized by the recognition unit 156. In principle, the familiarity toward a user who carries out a pleasant action increases, while the familiarity toward a user who carries out an unpleasant action decreases.

The operation control unit 150 decides a motion of the robot 100 in cooperation with the operation control unit 222 of the server 200. One portion of motions may be fixed by the server 200, and other motions may be fixed by the robot 100. Also, a configuration may be such that although the robot 100 fixes a motion, the server 200 fixes a motion when a processing load of the robot 100 is high. A configuration may be such that a motion forming a base is fixed by the server 200, and an additional motion is fixed by the robot 100. It is sufficient that the way a motion fixing process is divided between the server 200 and the robot 100 is designed in accordance with specifications of the robot system 300.

The operation control unit 150 instructs the drive mechanism 120 to execute a selected motion. The drive mechanism 120 controls each actuator in accordance with a motion file.

The operation control unit 150 can also execute a motion of holding up both arms 106 as a gesture asking for "a hug" when a user with a high degree of familiarity is nearby, and can also perform a motion of no longer wanting to be hugged by causing the left and right front wheels 102 to alternately and repeatedly rotate in reverse and stop in a housed state when bored of the "hug". The drive mechanism 120 causes the robot 100 to perform various motions by driving the front wheels 102, the arm 106, and the head portion (the head portion frame 316) in accordance with an instruction from the operation control unit 150.

Next, an implementation of the robot system 300 in the embodiment will be described, with the heretofore described basic configuration as a precondition. Hereafter, a description will be given centered particularly on differences between features and objects of the implementation and those of the basic configuration.

Figure 7:
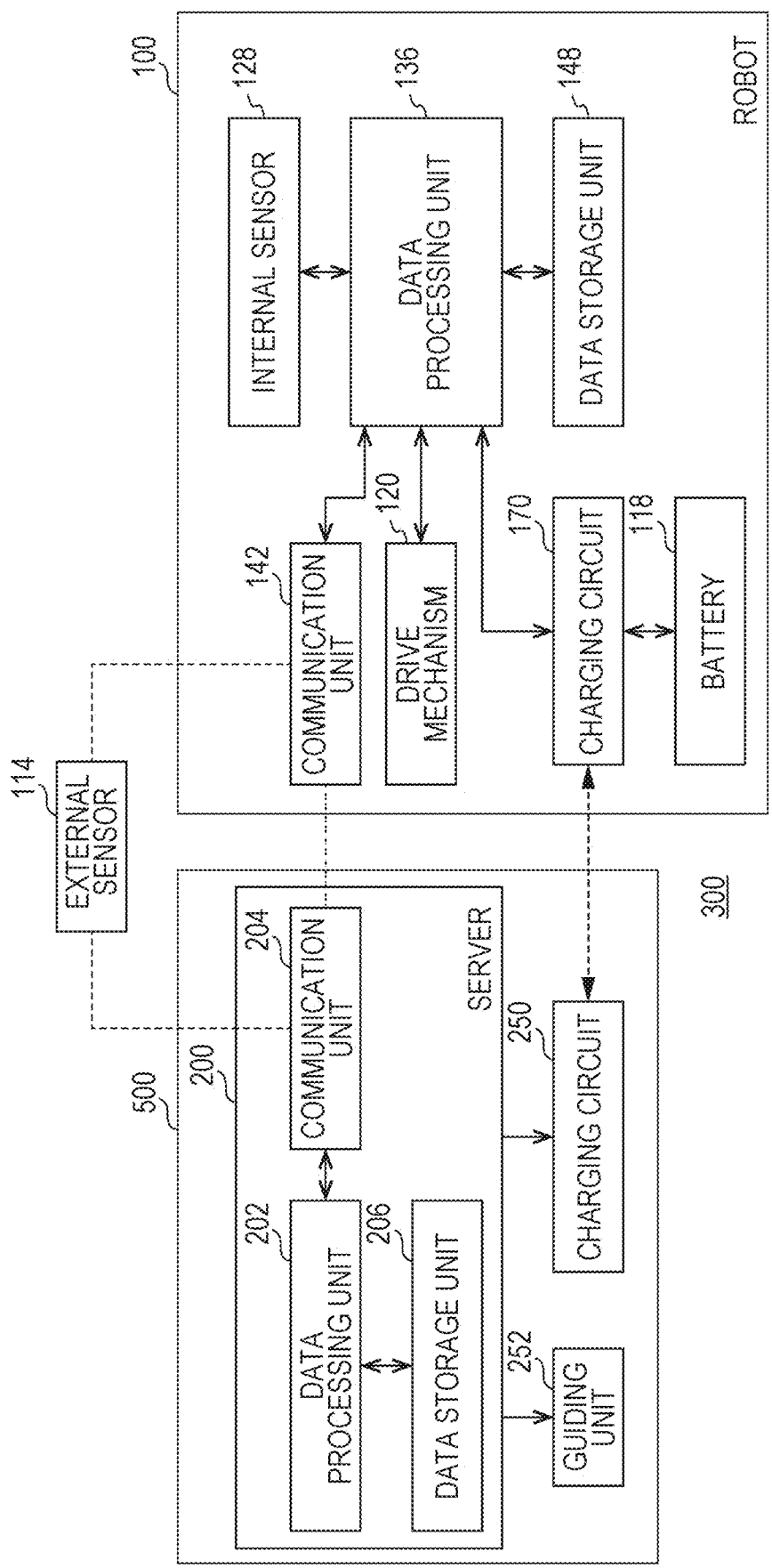
FIG. 7 is a functional block diagram of the robot system.

FIG. 7 is a functional block diagram of the robot system 300.

The robot system 300 includes the robot 100, the station 500, and the multiple of external sensors 114. The server 200 is provided in the station 500. The robot 100 includes the battery 118 and a charging circuit 170 in addition to the configuration shown in FIG. 6. The internal sensor 128 further includes a remaining battery charge sensor.

Meanwhile, the station 500 further includes a charging circuit 250 and a guiding unit 252. Charging of the battery 118 can be carried out by the charging circuit 170 of the robot 100 being connected to the charging circuit 250 of the station 500. The guiding unit 252 includes a transmitting circuit that outputs a guide signal for guiding the robot 100 to the station 500. The data processing unit 202 of the server 200 controls the transmitting circuit. Details of a guiding method and the like will be described hereafter.

FIGS. 8A to 8C are drawings representing a state wherein the outer skin 314 is mounted on the robot 100. FIG. 8A is a right side view, FIG. 8B is a front view, and FIG. 8C is a back view. An external appearance of the robot 100 has practically bilateral symmetry.

A housing port 377 for housing the rear wheel 103 is provided in a lower rear portion of the trunk portion frame 318 in the robot 100. Further, a pair of charging terminals 510 are disposed protruding one each on the left and right of the housing port 377. A base end of the charging terminal 510 is positioned in an interior of the trunk portion frame 318, and is connected to the charging circuit 170 (refer to FIG. 7) via unshown wiring. A leading end of the charging terminal 510 is of a disc form with a slightly large diameter, and has a form resembling a button.

The outer skin 314 is configured by an outer skin main body 420 and an elastic mounting portion 422 being sewn together. The outer skin main body 420 and the elastic mounting portion 422 are both formed of a flexible material. The outer skin main body 420 includes a bag-form portion 424 covering the head portion frame 316, a pair of hand portions 426 extending downward from left and right side faces of the bag-form portion 424, an extended portion 428 extending downward from a front face of the bag-form portion 424, and an extended portion 430 extending downward from a back face of the bag-form portion 424. An aperture portion 432 for causing the facial region 116 to be exposed is provided in the front face side of the bag-form portion 424.

The elastic mounting portion 422 configures a bottom portion of the outer skin 314, and links the front and back extended portions 428 and 430 of the outer skin main body 420 from below. An aperture portion 434 is provided in a position corresponding to the housing port 377 in the elastic mounting portion 422. A pair of holes 436 are formed in a lower rear portion of the elastic mounting portion 422. The hole 436 has a small-width form like a buttonhole, but as the elastic mounting portion 422 is flexible, the hole 436 can be expanded in a width direction. One each of the pair of charging terminals 510 is inserted through the holes 436. After the charging terminal 510 is inserted through the hole 436, the hole 436 returns to the original small-width form owing to an elastic force. Because of this, a head portion of the charging terminal 510 catches on a periphery of the hole 436, whereby the outer skin 314 is prevented from coming off. That is, the charging terminal 510 is a terminal for charging, and is also a member for fixing the outer skin 314.

Also, an infrared sensor 172 and a pair of microphones 174 are provided as the internal sensor 128 in the rear portion cover 107 (the tail) of the robot 100. That is, the infrared sensor 172 is provided in a central portion of the rear portion cover 107, a left microphone 174L is provided on a left side of the infrared sensor 172, and a right microphone 174R is provided on a right side. In a state wherein the rear portion cover 107 is opened and the rear wheel 103 is outside, the infrared sensor 172 and the pair of microphones 174 face the rear of the robot 100. The infrared sensor 172 and the pair of microphones 174 are used in a guiding control when the robot 100 enters the station 500.

Figure 9:
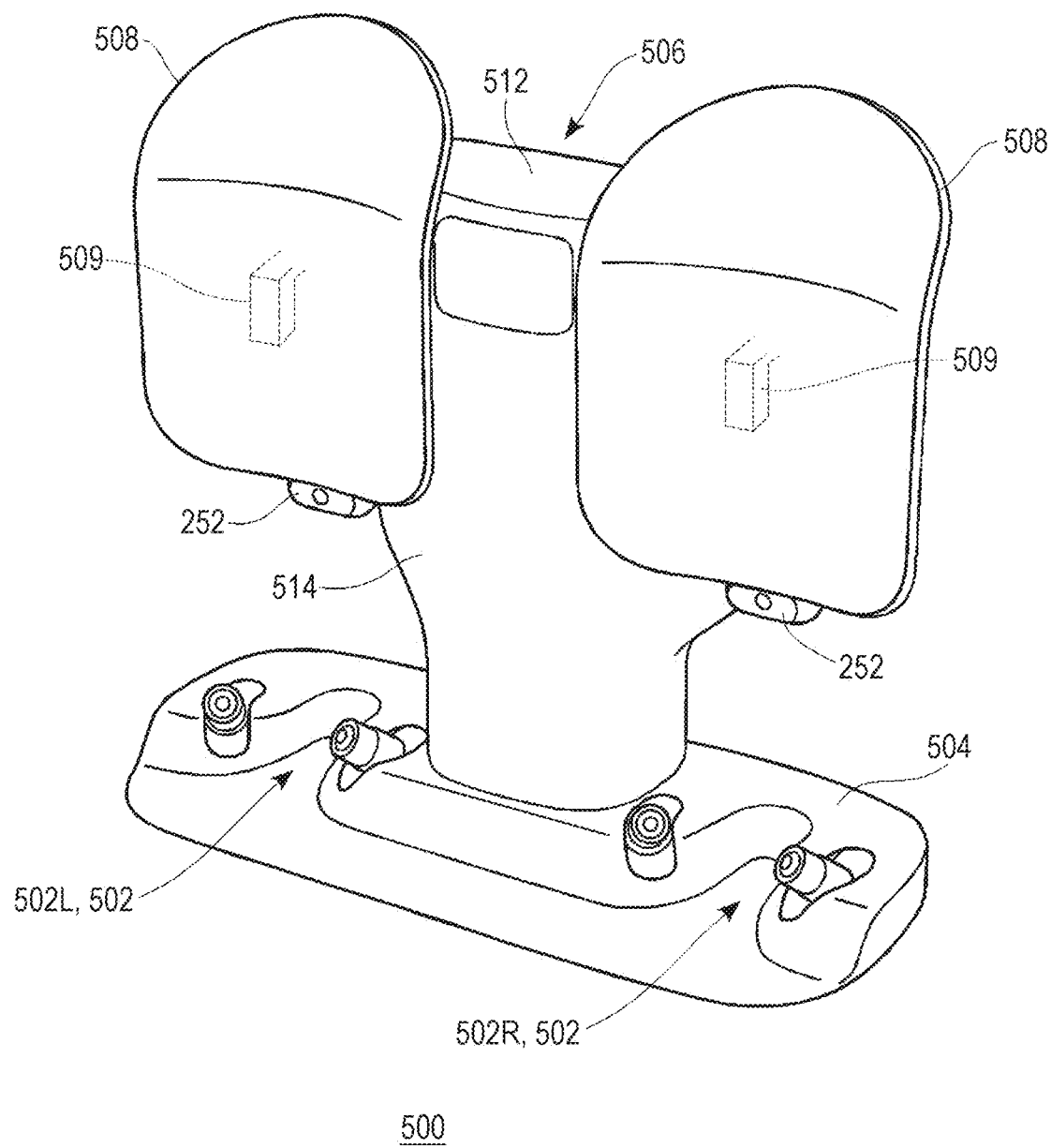
FIG. 9 is a perspective view representing an external appearance of a station.

FIG. 9 is a perspective view representing an external appearance of the station 500. Hereafter, for ease of description, an innermost side in a direction of entrance (a leading side in a direction of entrance) of the robot 100 in the station 500 may be expressed as a "far side", and a near side in a direction of entrance (a trailing side in a direction of entrance) may be expressed as a "near side" or a "front side".

The station 500 includes a charging unit 506, which is a main portion for charging, and members for decoration, such as a pair of back face panels 508. The charging unit 506 includes the base 504 and a unit main body 512. The base 504 is of a rectangular form in plan view, and a charging space 502 is provided on the left and the right. The unit main body 512 is disposed upright in a center of an upper face of the base 504. The unit main body 512 has a housing 514 whose upper half portion is expanded. The pair of back face panels 508 are disposed one each to the left and right in front of the housing 514. The back face panel 508 is detachably attached to the unit main body 512 via a fixing member 509. The fixing member 509 is an arm-form member, one end thereof is detachably fixed to a back face of the back face panel 508, and the other end is detachably fixed to a back face of the housing 514. The guiding unit 252 is provided in a position below each back face panel 508 on the left and the right of the housing 514.

Figure 10A:
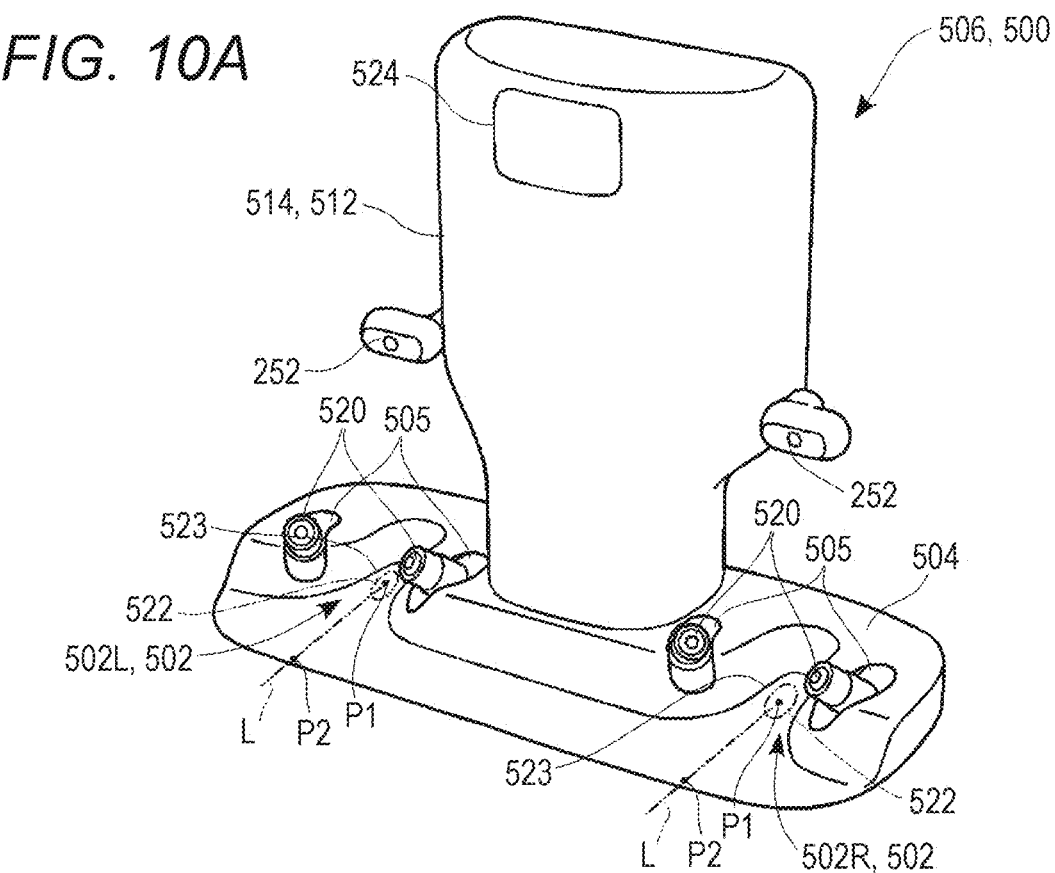
FIG. 10A is a perspective view representing an external appearance of a charging unit.
Figure 10B:
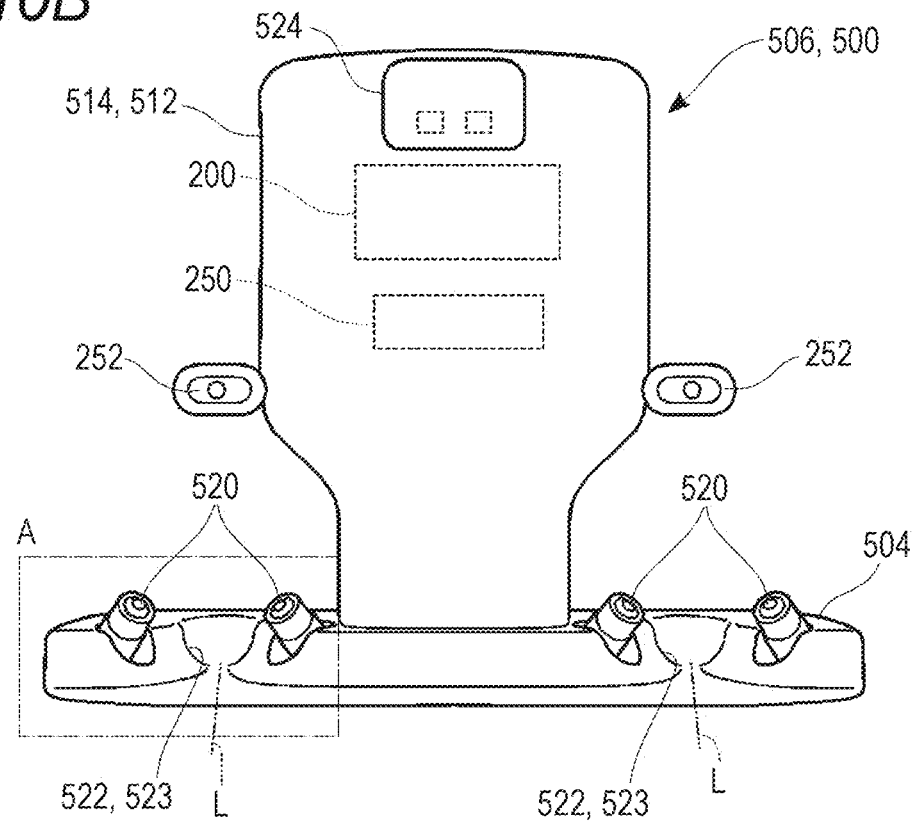
FIG. 10B is a front view representing an external appearance of the charging unit.

FIGS. 10A and 10B are drawings representing an external appearance of the charging unit 506. FIG. 10A is a perspective view, and FIG. 10B is a front view.

The charging unit 506 has a structure with bilateral symmetry, and charging of the robot 100 can be carried out in each of the charging space 502 on the left side as seen from the front (also called a "left space 502L") and the charging space 502 on the right side (also called a "right space 502R"). The housing 514 houses the server 200 and the charging circuit 250. A pair of power supply terminals 520 are disposed in each charging space 502. One of the pair of power supply terminals 520 is connected to a power supply line of the charging circuit 250, and the other is connected to a grounding line.

Left and right upper faces of the base 504 have an inclined face for guiding the robot 100 smoothly into each charging space 502. A target position P1 is set for each charging space 502 on the left and right upper faces of the base 504. An axle bearing 522 for the rear wheel 103 of the robot 100 to drop into is provided in the target position P1. An entrance side of the base 504 is opened wide, and a reference entrance line L is set virtually in such a way as to connect the target position P1 and an entrance frontal position P2 (corresponding to a "specific position"). The reference entrance line L indicates a path along which the robot 100 can most efficiently enter toward the charging unit 506, or in other words, a path along which the rear wheel 103 can most efficiently arrive at the target position P1, and is set linearly in the embodiment.

The base 504 has a form wherein a left side and a right side of the reference entrance line L in each charging space 502 bulge increasingly toward the far side. A far side interval between left and right bulging portions is reduced, whereby a guide path 523 for guiding the rear wheel 103 linearly to the target position P1 is formed. A width of the guide path 523 is slightly greater than a width of the rear wheel 103. The axle bearing 522 is provided in a center of the guide path 523. A pair of aperture portions 505 are provided on the near sides of the left and right bulging portions, and the pair of power supply terminals 520 are caused to protrude therefrom. The pair of aperture portions 505 are positioned one each on the left side and the right side of the guide path 523. The power supply terminal 520 extends forward, slightly upward, and oriented toward the reference entrance line L. That is, the pair of power supply terminals 520 are supported in such a way as to be oriented slightly inward with respect to the charging space 502. The pair of power supply terminals 520 can be connected one each to the pair of charging terminals 510 in a state wherein the rear wheel 103 has arrived at the axle bearing 522.

The pair of guiding units 252 are provided in such a way as to protrude one each from left and right side faces of the housing 514. The left side guiding unit 252 is positioned above the reference entrance line L of the left space 502L. The right side guiding unit 252 is positioned above the reference entrance line L of the right space 502R. Each guiding unit 252 transmits a guide signal for guiding the robot 100 into the corresponding charging space 502. The guiding unit 252 has an ultrasonic wave transmitter, which transmits an ultrasonic wave signal as a guide signal, and an infrared transmitter, which transmits an infrared signal. The transmitters are connected to the server 200, and are controlled by the data processing unit 202.

When the robot 100 nears the station 500, an ultrasonic signal and an infrared signal are transmitted from the guiding unit 252. The robot 100 receives the infrared signal using the infrared sensor 172, and receives the ultrasonic signal using the pair of microphones 174 (the left microphone 174L and the right microphone 174R) (refer to FIG. 8C). The robot 100 calculates a distance to the target position P1 based on a difference between arrival times of the ultrasonic signal and the infrared signal transmitted from the guiding unit 252, and adjusts a traveling speed (a speed of entering the charging space 502) based on a result of the calculation. The robot 100 also calculates the speed of entering the charging space 502 based on a difference between arrival times of the ultrasonic signals received by the left microphone 174L and the right microphone 174R, and adjusts a direction of travel (an angle at which the charging space 502 is entered) based on a result of the calculation.

A reference value providing unit 524 for calibration is provided on an upper front face of the unit main body 512. Calibration of the thermosensor 115 of the robot 100 can be carried out in the station 500. The reference value providing unit 524 is controlled by the server 200. The reference value providing unit 524 has two constant heat sources set to differing temperatures. The difference between the temperatures is set in advance (the difference in temperature between the two constant heat sources is also called a "set temperature difference"). The robot 100 measures the difference in temperature between the two constant heat sources based on values of outputs of the thermosensor 115 (a temperature difference measured at this time is also called a "measured temperature difference"). The robot 100 can execute a calibration by comparing the set temperature difference and the measured temperature difference, and correcting a difference between the two.

Next, a wheel guiding structure and a charging terminal connection structure in the station 500 will be described in detail.

Figure 11A:
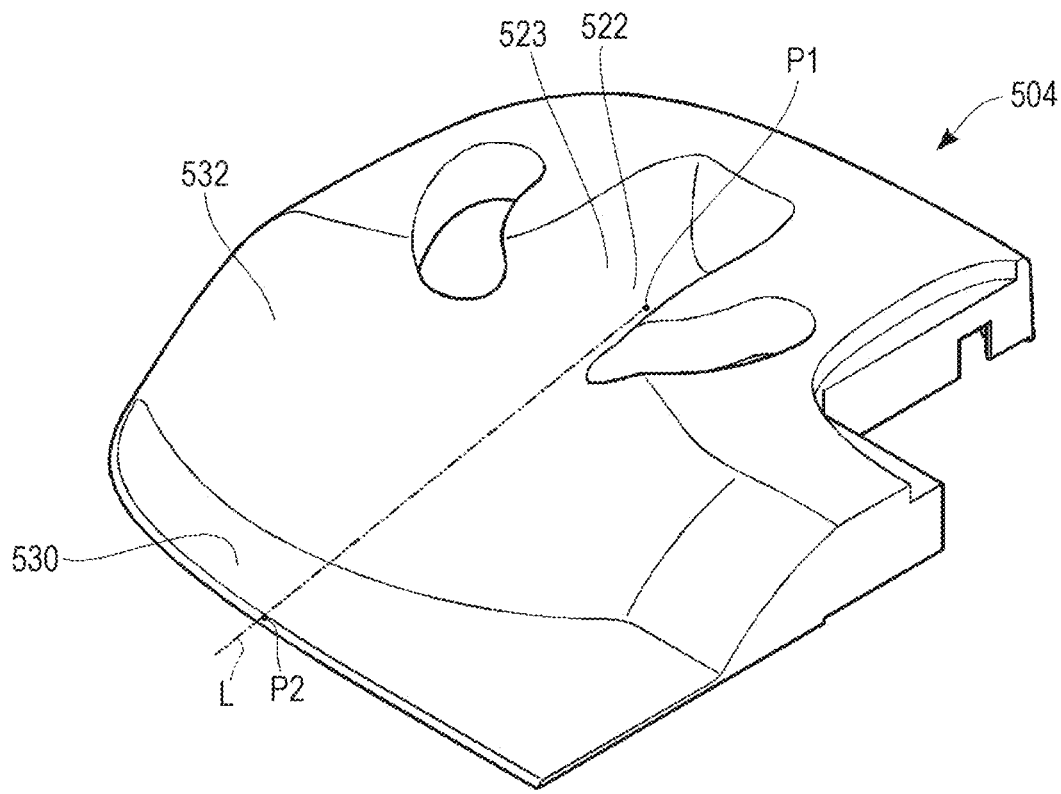
FIG. 11A is an illustration (a perspective view) representing a form of an upper face of a base.

FIGS. 11A to 13H are illustrations representing a form of the upper face of the base 504. For ease of description, a portion corresponding to an A portion of FIG. 10B is shown in an extracted form, and the power supply terminal 520 is omitted. FIG. 11A is a perspective view, and FIG. 11B is a front view. FIG. 12A is a plan view, and FIG. 12B is a sectional view seen along an X-X arrow of FIG. 11B. FIGS. 13A to 13H show sectional views seen along arrows A-A to H-H respectively of FIG. 12A.

Figure 11B:
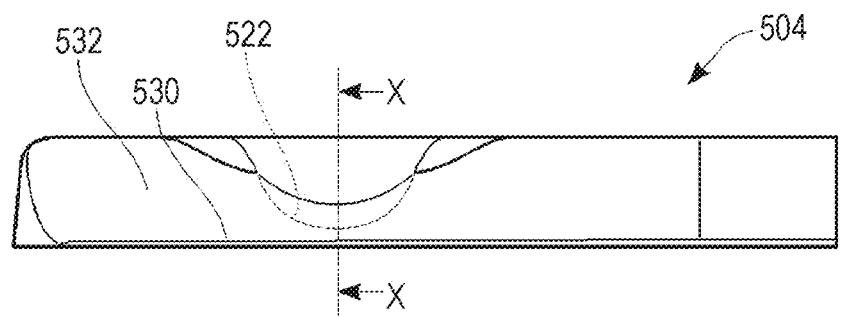
FIG. 11B is an illustration (a front view) representing a form of the upper face of the base.

As shown in FIGS. 11A and 11B, the base 504 is such that the axle bearing 522 is provided recessed in a far-side region thereof, and the target position P1 is set. A flat portion 530 having barely any difference in level with the floor surface F is provided in the front entrance of the base 504. The base 504 has an inclined face 532 that connects smoothly with the flat portion 530.

Figure 12A:
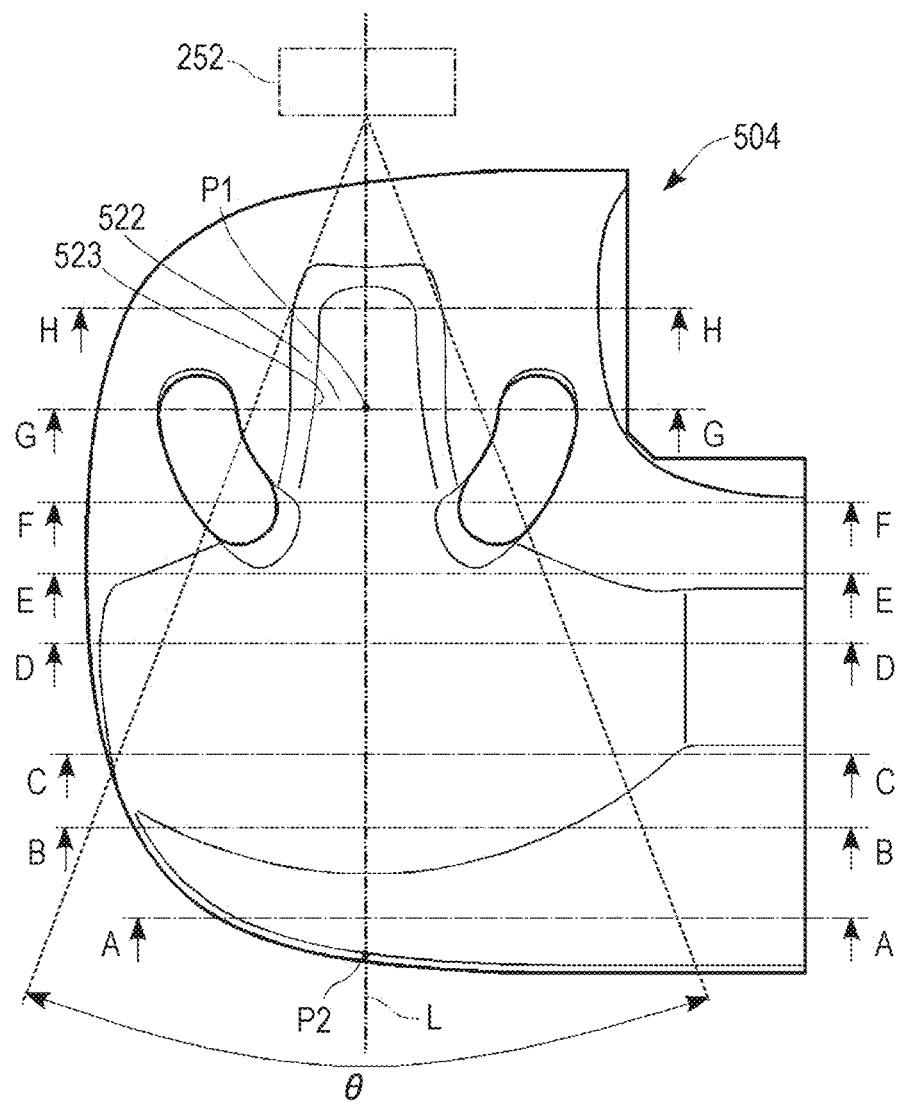
FIG. 12A is an illustration (a plan view) representing a form of the upper face of the base.
Figure 12B:
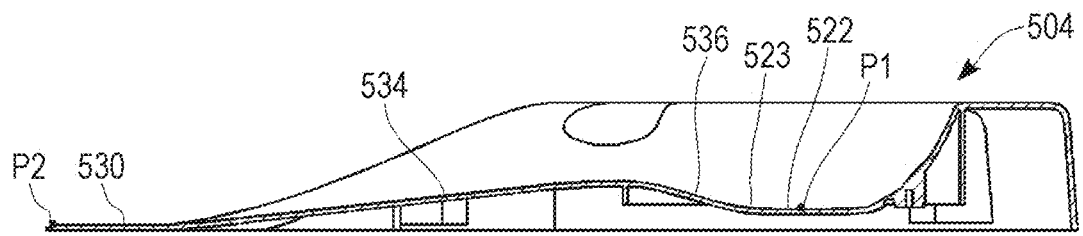
FIG. 12B is an illustration (a sectional view seen along an X-X arrow of FIG. 11B) representing a form of the upper face of the base.
Figure 13A:
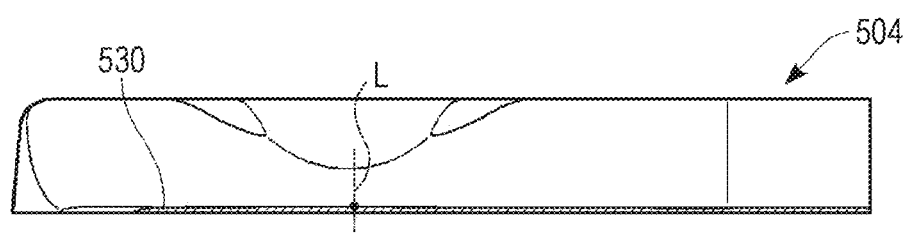
FIG. 13A is an illustration (a sectional view seen along an A-A arrow of FIG. 12A) representing a form of the upper face of the base.
Figure 13B:
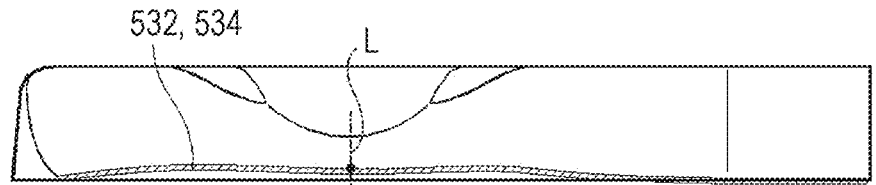
FIG. 13B is an illustration (a sectional view seen along a B-B arrow of FIG. 12A) representing a form of the upper face of the base.
Figure 13C:
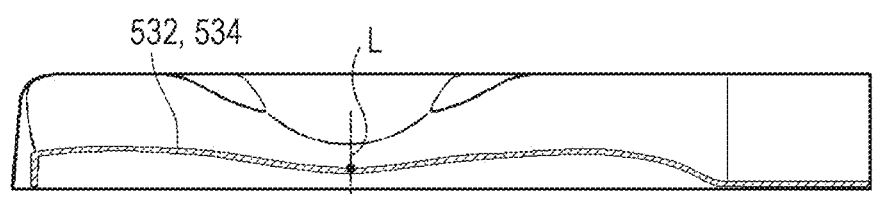
FIG. 13C is an illustration (a sectional view seen along a C-C arrow of FIG. 12A) representing a form of the upper face of the base.
Figure 13D:
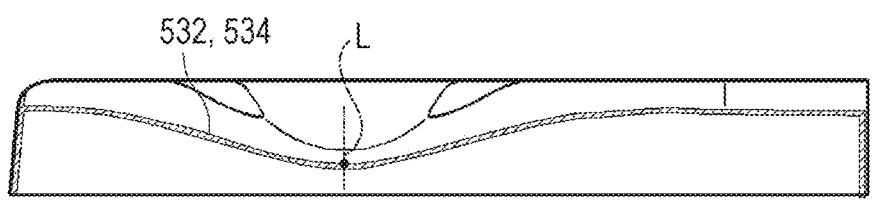
FIG. 13D is an illustration (a sectional view seen along a D-D arrow of FIG. 12A) representing a form of the upper face of the base.
Figure 13E:
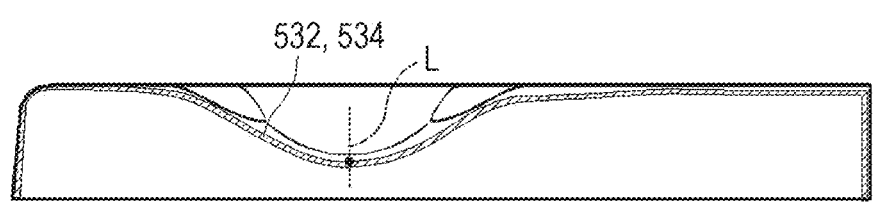
FIG. 13E is an illustration (a sectional view seen along an E-E arrow of FIG. 12A) representing a form of the upper face of the base.
Figure 13F:
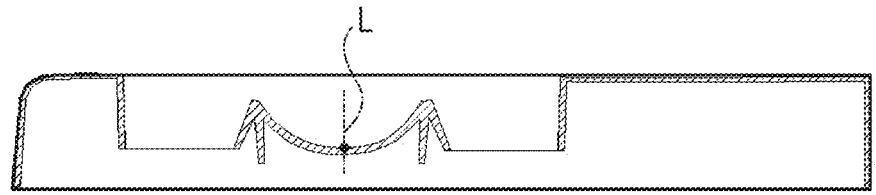
FIG. 13F is an illustration (a sectional view seen along an F-F arrow of FIG. 12A) representing a form of the upper face of the base.
Figure 13G:
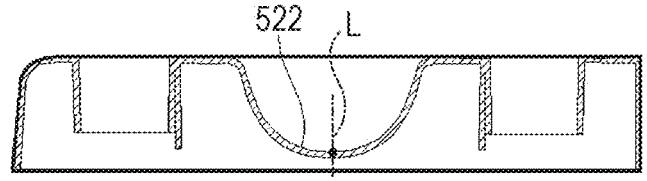
FIG. 13G is an illustration (a sectional view seen along a G-G arrow of FIG. 12A) representing a form of the upper face of the base.
Figure 13H:
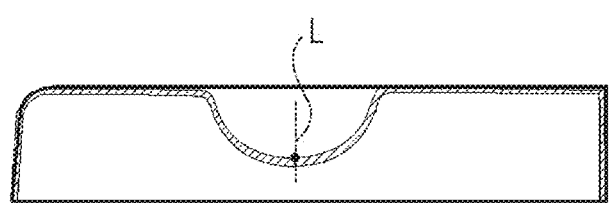
FIG. 13H is an illustration (a sectional view seen along an H-H arrow of FIG. 12A) representing a form of the upper face of the base.

As shown in FIGS. 12A and 12B, the base 504 has an upward inclination 534 and a downward inclination 536 that are continuous along the reference entrance line L from the entrance frontal position P2 toward the target position P1. Further, the upward inclination 534 has a gentler gradient than the downward inclination 536. The axle bearing 522 is provided ahead of the downward inclination 536, and the target position P1 is set in a center of the axle bearing 522. Owing to the gradient of the downward inclination 536 being greater while a width thereof is reduced, as shown in the drawings, the rear wheel 103 that has arrived at the target position P1 does not return to the near side due to a recoil. The axle bearing 522 is positioned in such a way that a contact pressure acts between the charging terminal 510 and the power supply terminal 520. In the embodiment, the guiding unit 252 is positioned on a normal of the reference entrance line L, as shown in the drawings. Further, although a setting is such that directivities (a directional angle θ) of ultrasonic waves and infrared rays transmitted from the guiding unit 252 are both in the region of 60 degrees (in the region of 30 degrees to each of the left and right centered on the reference entrance line L), another value may be set.

As shown in FIGS. 13A to 13H, the upper face of the base 504 has a three-dimensional curved form that inclines in such a way as to become lower toward the reference entrance line L on both sides of the reference entrance line L. As shown in FIGS. 13B to 13E, the upper face of the base 504 has a form such that a gradient (a lateral gradient) on both sides, having the reference entrance line L as a boundary, becomes greater the nearer to the far side in the upward inclination 534 section. Because of this, the upper face of the base 504 has a downward gradient toward the entrance side, and has a form that spreads in a fan shape.

Figure 14A:
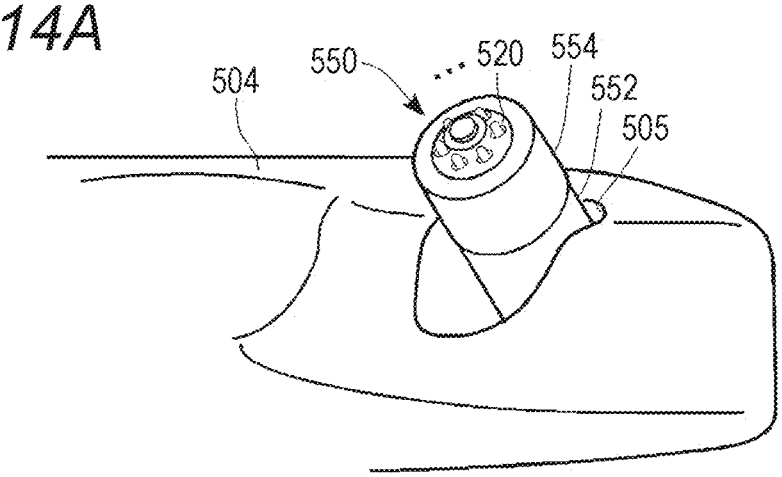
FIG. 14A is a drawing representing a terminal unit including a power supply terminal and a peripheral structure thereof.
Figure 14B:
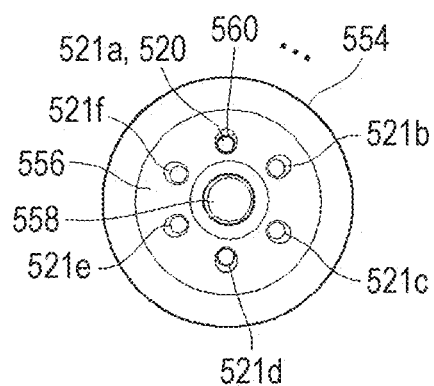
FIG. 14B is a front view showing a leading end portion of the terminal unit including the power supply terminal.
Figure 14C:
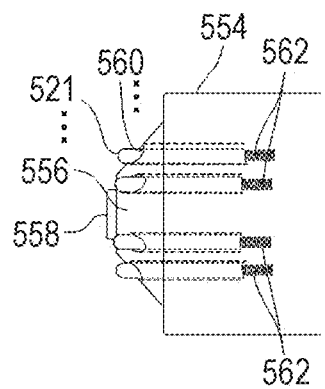
FIG. 14C is a side view showing the leading end portion of the terminal unit including the power supply terminal.

FIGS. 14A to 14C are drawings representing a structure of a terminal unit including the power supply terminal 520. FIG. 14A shows the terminal unit and a peripheral structure thereof. FIG. 14B is a front view showing a leading end portion of the terminal unit. FIG. 14C is a side view showing a leading end portion of the terminal unit.

As shown in FIGS. 14A and 14B, a terminal unit 550 has a terminal support portion 554 in a leading end portion of a cylindrical main body 552, and the power supply terminal 520 is supported in such a way as to be relatively displaceable in the terminal support portion 554. A base end portion of the main body 552 is supported by the base 504.

The power supply terminal 520 includes a multiple of pin terminals 521a to 521f (these will be called "pin terminals 521" when not particularly distinguishing among them).

That is, the power supply terminal 520 is configured of a multiple of the pin terminals 521, and the pin terminals 521 are electrically connected. A leading end of each pin terminal 521 is spherical.

As shown in FIGS. 14B and 14C, the terminal support portion 554 has, in a leading end portion thereof, a tapered face 556 whose diameter decreases toward a leading end, and a magnet 558 (a permanent magnet) of a disc form is provided in a center of a leading end face. A multiple of insertion holes 560 (six in the embodiment) are provided in such a way as to extend in an axial direction in a periphery of the magnet 558 in the terminal support portion 554. The insertion holes 560 are opened in the tapered face 556. The pin terminals 521a to 521f are supported one each in the six insertion holes 560 in such a way as to be able to slide. A spring 562 (which functions as a "biasing member") is disposed in a rear portion of each insertion hole 560, and biases the pin terminal 521 forward. Because of this, the pin terminal 521 protrudes by a predetermined amount from an aperture portion of the tapered face 556 in a state wherein the charging terminal 510 is not connected to the power supply terminal 520.

When a value of a current supplied from the power supply terminal 520 increases in order to carry out a high-speed charging, a current density can be lowered, and heat generation can be restricted, by increasing an area of contact between the power supply terminal 520 and the charging terminal 510 using the heretofore described configuration. That is, in order to secure a wide area of contact between the two terminals, it is sufficient to use a wide electrode (terminal). However, when the wide electrode is configured of a single terminal, the angle of entrance of the robot 100 needs to be strictly adjusted in order to cause contact with a whole face of the terminal. Because of this, a structure wherein a multiple of pin-form terminals are provided, and the terminals slide individually in a terminal connection direction, is adopted in the embodiment. Also, each pin terminal 521 is individually biased by the spring 562. This means that even when the power supply terminal 520 and the charging terminal 510 are inclined with respect to an original connection angle, each pin terminal 521 is biased toward the charging terminal 510 in a direction such as to come into contact, and comes into contact with the charging terminal 510. Because of this, the necessary area of contact between the two terminals can be secured, even when the angle of entrance of the robot 100 deviates from an ideal angle. In other words, the angle of entrance of the robot 100 can be afforded greater tolerance. An oxide film is removed by each pin terminal 521 rubbing against the charging terminal 510 before connection of the power supply terminal 520 is completed. This also contributes to securing an area of contact.

Figure 15A:
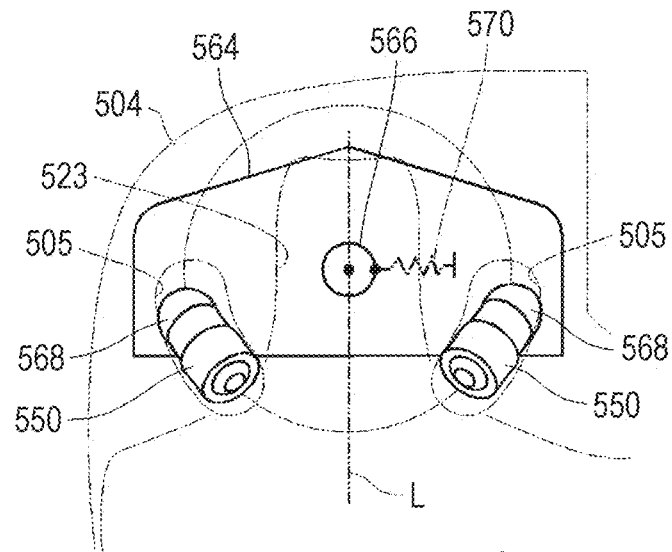
FIG. 15A is a drawing, among schematic views representing a support structure of the terminal unit in the base, showing a standby state (an unloaded state) of the terminal unit.
Figure 15B:
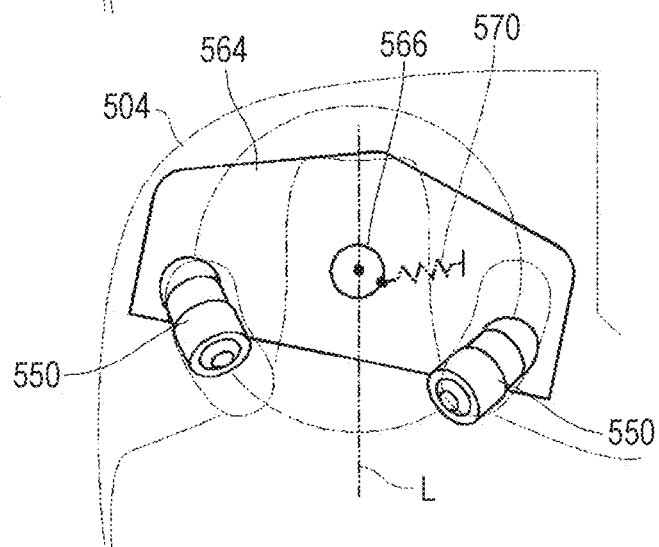
FIG. 15B is a drawing, among schematic views representing the support structure of the terminal unit in the base, showing a state that may occur (a loaded state) when the robot is connected to the terminal unit.
Figure 15C:
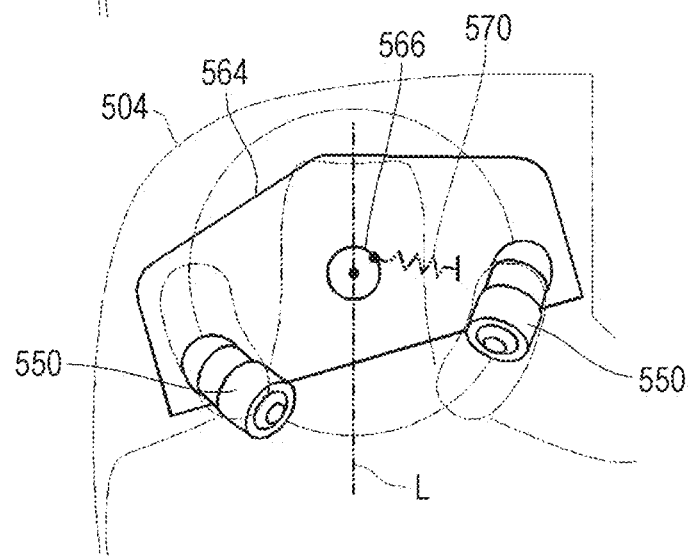
FIG. 15C is a drawing, among schematic views representing the support structure of the terminal unit in the base, showing a state that may occur (a loaded state) when the robot is connected to the terminal unit.

FIGS. 15A to 15C are schematic views representing a support structure (support mechanism) of the terminal unit 550 in the base 504. FIG. 15A shows a standby state (an unloaded state) of the terminal unit 550. FIGS. 15B and 15C show a state that may occur (a loaded state) when the robot 100 is connected to the terminal unit 550.

As shown in FIG. 15A, a left and right pair of terminal units 550 are supported by a plate-form supporting member 564, and the supporting member 564 is supported by the base 504. The supporting member 564 is disposed in an internal space of the base 504, and is supported in such a way as to be able to pivot centered on a pivot shaft 566 disposed upright on the base 504. The pivot shaft 566 is provided on the normal of the reference entrance line L, and is positioned below the guide path 523. A supporting portion 568 of a circular boss form is provided on the left and the right of the supporting member 564. Each supporting portion 568 has an axial line that inclines with respect to an upper face of the supporting member 564. When the terminal unit 550 is attached to each supporting portion 568, leading ends of both units are oriented slightly inward, and each is oriented obliquely forward and upward, as shown in the drawings.

A spring 570 (which functions as a biasing member) for holding the supporting member 564 in a pivoting direction reference position in a state wherein no external force is acting is disposed on the base 504. Herein, a "reference position" is a position wherein a front face of the supporting member 564 faces the front, or in other words, a position wherein the pair of terminal units 550 are at equal distances from the reference entrance line L.

Relative positions of the pair of terminal units 550 are practically unchanging. However, when the robot 100 enters the station 500 obliquely, that is, when the direction of entrance of the rear wheel 103 deviates even a little from the reference entrance line L, one of the pair of charging terminals 510 arrives at the power supply terminal 520 before the other. The pivoting structure of the supporting member 564 absorbs the deviation. That is, the supporting member 564 pivots clockwise or counter-clockwise in the drawings due to a pressing force caused by the charging terminal 510 that has arrived ahead (refer to FIGS. 15B and 15C). Because of this, connection between the charging terminal 510 that arrives later and the power supply terminal 520 is also promoted. That is, the power supply terminal 520 is supported by the base 504 in such a way as to be displaceable in accordance with the charging terminal 510.

The aperture portion 505 of the base 504 is of a long hole form (a slit form) in order to allow a displacement of the terminal unit 550 accompanying a pivoting of the supporting member 564. The spring 570 also functions as a shock absorber when the two terminals are connected.

Figure 16A:
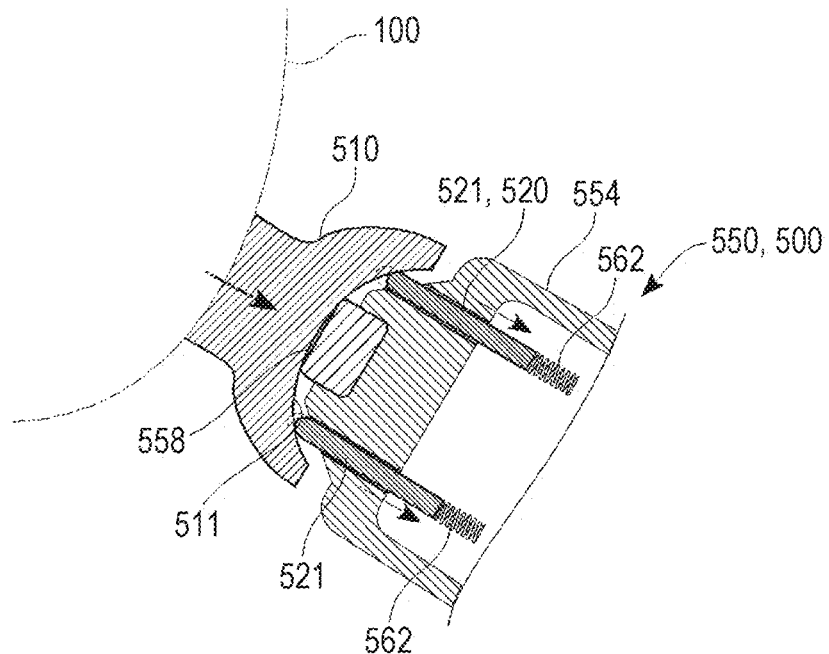
FIG. 16A is a partial sectional view among schematic views representing a connection structure of a charging terminal and the power supply terminal.
Figure 16B:
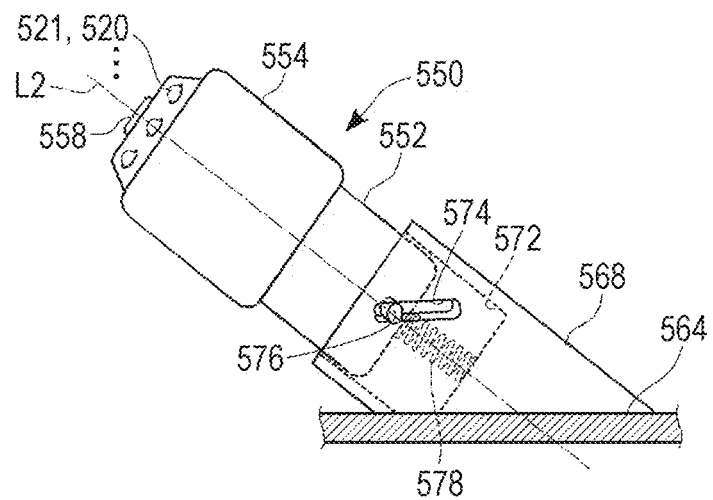
FIG. 16B is a drawing showing a movement of the terminal unit in a connection process among schematic views representing the connection structure of the charging terminal and the power supply terminal.
Figure 16C:
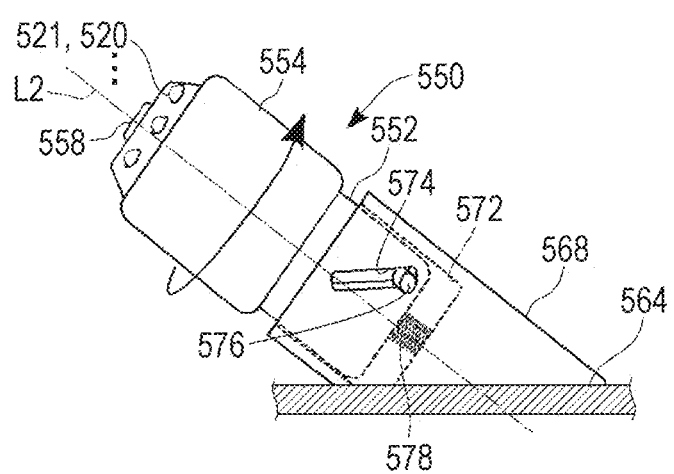
FIG. 16C is a drawing showing a movement of the terminal unit in the connection process among schematic views representing the connection structure of the charging terminal and the power supply terminal.

FIGS. 16A to 16C are schematic views representing a connection structure of the charging terminal 510 and the power supply terminal 520. FIG. 16A is a partial sectional view representing the connection structure. FIGS. 16B and 16C show a movement of the terminal unit 550 in a connection process.

As shown in FIG. 16A, the charging terminal 510 of the robot 100 is oriented slightly obliquely downward, and the power supply terminal 520 of the station 500 is oriented obliquely upward. Further, by an inclination of a larger gradient being provided on the near side of the axle bearing 522 as heretofore described (refer to FIG. 12B), the rear wheel 103 is biased backward, that is, in a direction such as to connect the charging terminal 510 and the power supply terminal 520. When the two connect, a backward-oriented inertial force of the robot 100 acts in an axial direction of the terminal unit 550 as a pressing force via the charging terminal 510 (refer to a two-dot chain line arrow).

As a connection face 511 of the charging terminal 510 is of a concave spherical form while a leading end of the terminal unit 550 has a protruding form (a tapered form), the two are of largely complementary forms. The charging terminal 510 and the power supply terminal 520 are connected by the magnet 558 in such a way as to be detachable. When the two terminals are connected, the power supply terminal 520 (the six pin terminals 521) is pressed down in an axial direction against the biasing force of the spring 562 (refer to a dashed-dotted line arrow). Owing to an elastic reaction force of the spring 562 generated at this time, a sufficient contact pressure is obtained between the two terminals, and a stable connection state is secured.

As the driving force (propulsive force) of the front wheels 102 is stopped when charging (a weak state), there is a possibility of an inertial force acting in a direction such as to cause the two terminals to separate due to a recoil caused by the stopping. Because of this, a connected state of the two terminals is maintained in the embodiment by an adsorptive force of the magnet 558. Also, as shown in FIGS. 15B and 15C, the two terminals can be connected by a suctioning force of the magnet 558 even when the direction of entrance of the robot 100 deviates somewhat from the reference entrance line L.

As shown in FIG. 16B, the supporting portion 568 has a guiding portion 572 that opens oriented obliquely upward, and the guiding portion 572 fits over the main body 552 of the terminal unit 550. The guiding portion 572 supports the main body 552 in such a way as to be able to slide along an axial line L2 thereof. The guiding portion 572 has a bottom face that is perpendicular to the axial line L2. The supporting portion 568 also has a guide hole 574 that extends in an oblique direction along a side face thereof. The guide hole 574 extends toward the rear from a vicinity of a leading end of the supporting portion 568 within a predetermined angle range centered on the axial line L2.

Meanwhile, an engagement pin 576 is disposed protruding in a vicinity of a rear end of the main body 552. The engagement pin 576 protrudes outward in a radial direction of the main body 552, and engages with the guide hole 574. As shown in the drawings, an outer diameter of the engagement pin 576 is practically the same as a width of the guide hole 574. A spring 578 (which functions as a "biasing member") that biases the terminal unit 550 in a protruding direction (upward along the axial line L2) is interposed between the bottom face of the guiding portion 572 and the main body 552.

According to this kind of configuration, the terminal unit 550 is supported elastically in a direction such as to protrude from the supporting unit 568. An amount of protrusion is regulated by the engagement pin 576 being locked to an upper end of the guide hole 574. When the charging terminal 510 of the robot 100 connects, the terminal unit 550 is pressed obliquely downward along the axial line L2. At this time, as shown in FIG. 16C, the engagement pin 576 is guided along the guide hole 574, whereby the main body 552, and by extension the terminal unit 550, rotates around the axial line L2. Because of this, each pin terminal 521 slides against the connection face 511 from the charging terminal 510 starting to come into contact with the power supply terminal 520 until the connection of the two is completed. Because of this, an oxide film or dirt adhering to a leading end face of the pin terminal 521 is scraped off, and an energization state of the two terminals can be kept good. That is, the pivoting mechanism of the terminal unit 550 functions as a self-cleaning mechanism that maintains the terminal contact face in a good state.

Figure 17A:
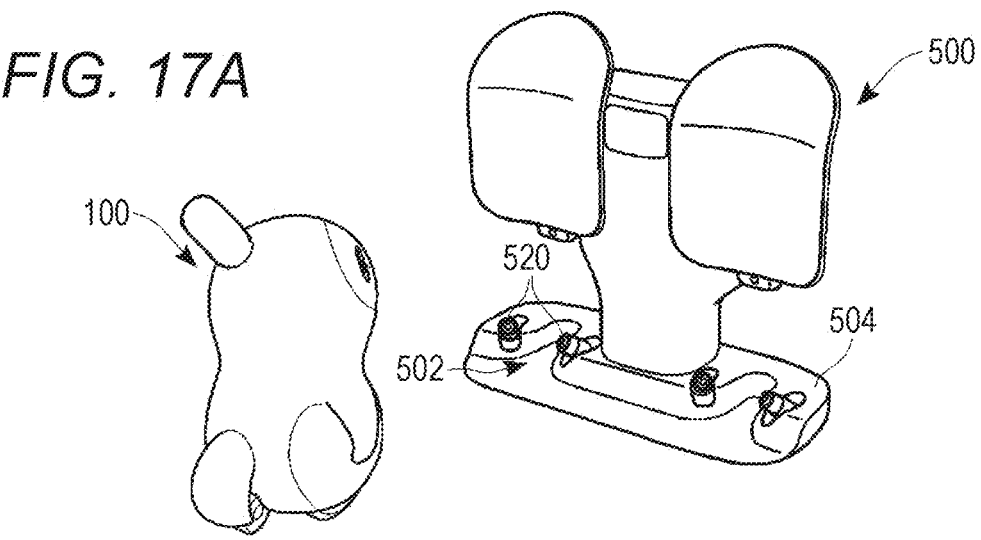
FIG. 17A is a drawing representing an entering operation of the robot, and is a drawing showing a process of the operation.
Figure 17B:
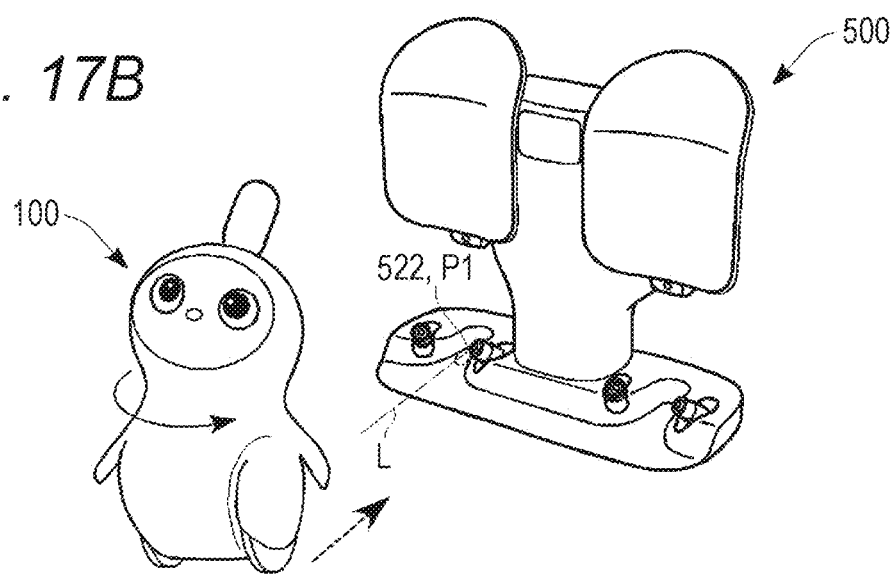
FIG. 17B is a drawing representing the entering operation of the robot, and is a drawing showing a process of the operation.
Figure 17C:
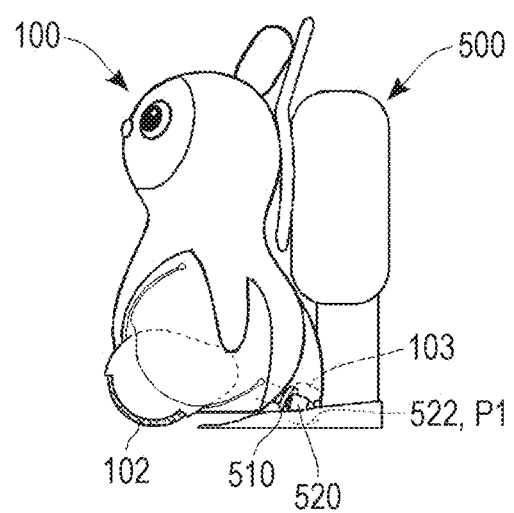
FIG. 17C is a drawing representing the entering operation of the robot, and is a drawing showing a process of the operation.

FIGS. 17A to 17C are drawings representing an entering operation of the robot 100. FIGS. 17A to 17C show a process of the operation.

When the time comes to carry out a charging of the battery 118, the robot 100 moves toward the station 500. At this time, the robot 100 heads toward the station 500 while avoiding an obstacle based on information from a camera, a form measuring sensor, or the like. When nearing the station 500 (FIG. 17A), the robot 100 reverses by inverting an orientation thereof, and enters the charging space 502 (FIG. 17B).

At this time, connection of the power supply terminal 520 and the charging terminal 510 is promoted, even when the direction of travel of the robot 100 is somewhat inclined with respect to the reference entrance line L set in the station 500. As already described, the upper face of the base 504 includes an inclined face of a three-dimensional curved form that provides the entering rear wheel 103 with a gravitational force component that acts toward the reference entrance line L (refer to FIGS. 13A to 13H). This means that provided that the robot 100 enters at an appropriate speed, the rear wheel 103 can be naturally guided to the axle bearing 522 (the target position P1) while causing the rolling of the rear wheel 103 to continue. The power supply terminal 520 is connected to the charging terminal 510 in a state wherein the rear wheel 103 has arrived at the target position P1 (FIG. 17C).

Figure 19A:
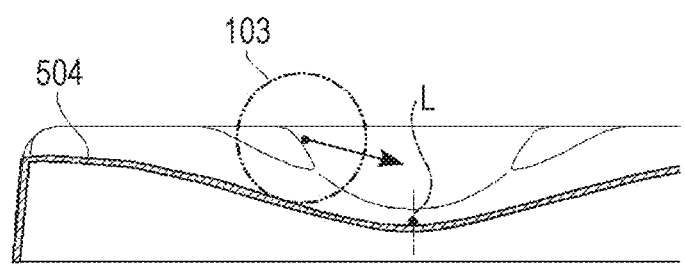
FIG. 19A is a schematic view showing an example of the wheel guiding mechanism, shows a vertical cross-section of a place in which a rear wheel is positioned in the wheel guiding process, and corresponds to FIG. 18A.
Figure 19B:
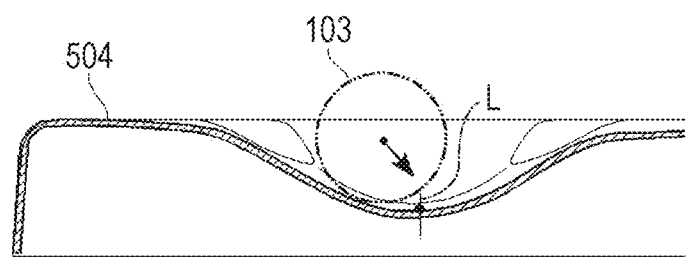
FIG. 19B is a schematic view showing an example of the wheel guiding mechanism, shows a vertical cross-section of a place in which the rear wheel is positioned in the wheel guiding process, and corresponds to FIG. 18B.
Figure 19C:
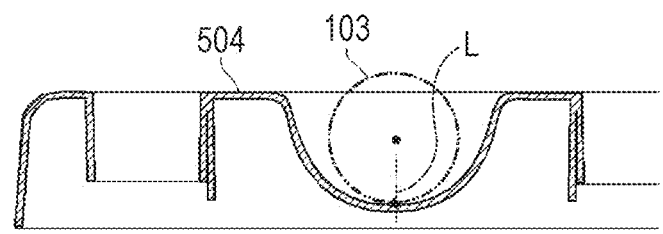
FIG. 19C is a schematic view showing an example of the wheel guiding mechanism, shows a vertical cross-section of a place in which the rear wheel is positioned in the wheel guiding process, and corresponds to FIG. 18C.

FIGS. 18A to 19C are schematic views showing an example of a wheel guiding mechanism. FIGS. 18A to 18C show a wheel guiding process in planar view. FIGS. 19A to 19C show vertical cross-sections of places in which the rear wheel 103 is positioned in the wheel guiding process, and correspond to FIGS. 18A to 18C respectively. In the drawings, for ease of description, only a positional relationship between the front wheels 102 and the rear wheel 103 is shown in connection with the robot 100, and only the charging space 502 (an entrance path of the robot 100) is shown in connection with the station 500.

Herein, a state wherein the direction of entrance of the robot 100 and the reference entrance line L deviate, that is, a case wherein the rear wheel 103 has entered the charging space 502 at an angle inclined with respect to the reference entrance line L, will be assumed. In this case, the rear wheel 103 is subjected to a combination of a gravitational component (a force acting from a high place toward a low place) generated by an inclination of the base 504 and the propulsive force of the front wheels 102, and carries out a movement unique to a caster, thereby causing a rolling direction thereof to change smoothly.

Specifically, the rear wheel 103 rolls naturally in such a way as to head toward the reference entrance line L, which is the low side, while advancing toward the far side (FIGS. 18A and 19A). As the gradients on the left and right of the reference entrance line L increase heading toward the far side of the base 504, the rolling stops in a vicinity of reference entrance line L (FIGS. 18B and 19B). In this way, the rear wheel 103 eventually arrives at the axle bearing 522 (the target position P1) provided at the far side of the reference entrance line L (FIGS. 18C and 19C).

Figure 20A:
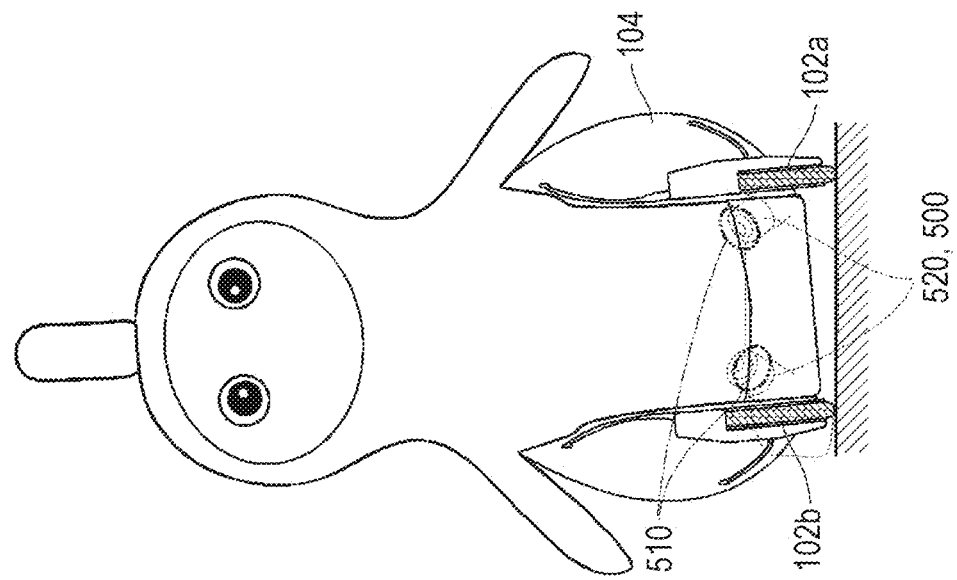
FIG. 20A is a drawing representing an operation when the robot leaves the station, and is a drawing showing a state when charging is completed.
Figure 20B:
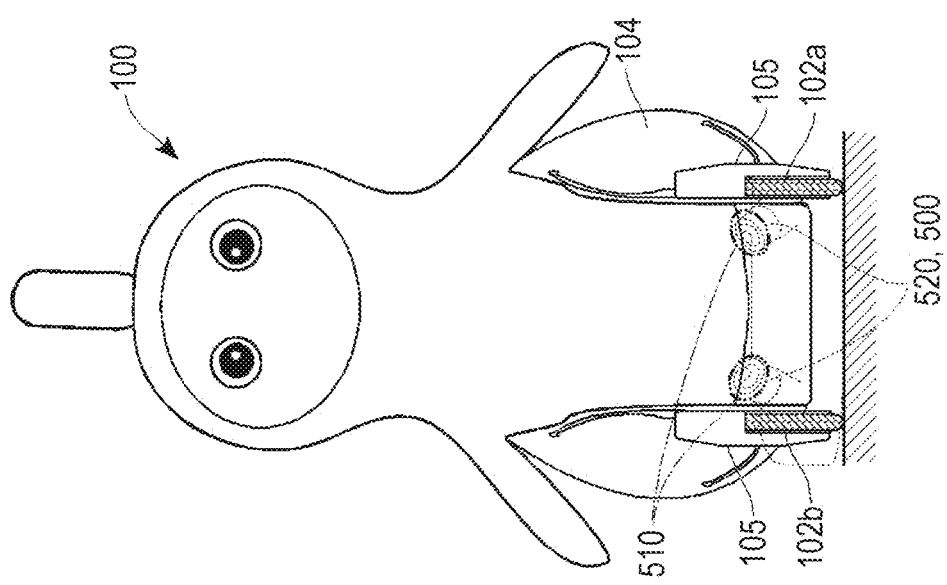
FIG. 20B is a drawing representing an operation when the robot leaves the station, and is a drawing showing a terminal releasing operation.

FIGS. 20A and 20B are drawings representing an operation when the robot 100 leaves the station 500. FIG. 20A shows a state when charging is completed, and FIG. 20B shows a terminal releasing operation.

When charging is completed and the robot 100 is caused to leave the station 500, the connection of the charging terminal 510 and the power supply terminal 520 needs to be released. As the two terminals are connected by the suctioning force of the magnet 558, however (refer to FIG. 16A), a case wherein the connection release is not easy, even when causing the robot 100 to advance as it is from the state shown in FIG. 20A, is envisaged.

Therefore, a terminal joint portion is twisted utilizing the fact that the left and right front wheels 102 can be driven to advance and withdraw individually, thereby releasing the connection. That is, by driving one of the left wheel 102a and the right wheel 102b to a withdrawal side (a wheel housing side) from the state shown in FIG. 20A, thereby dropping one side of the body 104, a shearing force is applied to the interface between the charging terminal 510 and the power supply terminal 520, and the two terminals can be pulled apart. By returning the front wheels 102 to the advanced state and causing the front wheels 102 to advance after the connection of the two terminals is released, the robot 100 can be caused to leave the station 500. This kind of withdrawal operation produces an aspect very much as though the robot 100 is shaking its backside before leaving the nest, and animal-like behavior and cuteness can be expressed simultaneously.

Heretofore, the robot 100, the station 500, and the charging system 10 including the robot 100 and the station 500, have been described based on an embodiment. According to the station 500, the rear wheel 103 can be guided naturally to the target position P1 by utilizing inertia and gravitational force (own weight) accompanying a rolling of the rear wheel 103, even when the angle of entrance of the robot 100 deviates. That is, the upper face of the base 504 includes an inclined face that provides the entering rear wheel 103 with a gravitational force component that acts toward the target position P1, because of which the rolling direction of the rear wheel 103, and by extension the direction of travel of the robot 100, are naturally corrected. Wheel guiding is the responsibility of the form of the base 504 itself, and can therefore be realized easily.

The invention not being limited by the heretofore described embodiment and modifications, components can be changed and embodied within a range not departing from the scope of the invention. Various inventions may be formed by combining a multiple of components disclosed in the heretofore described embodiment and modifications as appropriate. Also, some components may be deleted from among all the components shown in the heretofore described embodiment and modifications.

In the heretofore described embodiment, a configuration wherein the charging terminal 510 and the power supply terminal 520 are fixed using the magnet 558 (a permanent magnet), as shown in FIG. 16A, has been given as an example. In a modification, an electromagnet may be employed instead of a permanent magnet. By maintaining energization of the electromagnet during charging, and stopping the energization before the robot 100 leaves the charging station 500, separation of the two terminals can be carried out easily. The connection of the two terminals can be released without performing an operation of twisting the body 104 as in the heretofore described embodiment.

In the heretofore described embodiment, pulling the two terminals apart by applying a shearing force to an interface between the charging terminal 510 and the power supply terminal 520 by tilting the robot 100 obliquely, as shown in FIGS. 20A and 20B, has been given as an example. In a modification, the two terminals may be pulled apart by moving the terminal unit 550 in such a way as to apply a shearing force to an interface between the charging terminal 510 and the power supply terminal 520. The terminal unit 550 of FIGS. 15A to 15C is attached to the supporting member 564, and formed in such a way as to be able to pivot around the pivot shaft 566. In a modification, a pivot shaft that extends in a direction perpendicular to the pivot shaft 566 (for example, a pivot shaft that extends in directions to the front and back of the supporting member 564) is added, and the supporting member 564 is caused to pivot around the pivot shaft when causing the two terminals to separate. By so doing, a shearing force can be applied to an interface between the charging terminal 510 and the power supply terminal 520, without the robot 100 causing a posture to change obliquely.

In the heretofore described embodiment, the pivot shaft 378 and the actuator 379 are provided in each of the left wheel 102a and the right wheel 102b, as shown in FIG. 3, and a reciprocal drive of each wheel can be controlled individually. In a modification, a shared pivot shaft and actuator may be provided for the left and right wheels, and the wheels reciprocally driven integrally. In this case, twisting the body 104 of the robot 100 becomes difficult, but the body 104 can be shaken up and down, meaning that even when the two terminals are fixed using a permanent magnet, this can be released. Note that the operation of twisting the body 104 as in the heretofore described embodiment is preferable in that a shearing force is effectively applied to an interface of the two terminals easily.

In the heretofore described embodiment, a configuration wherein a power supply terminal is caused to rotate around an axial line utilizing a pressing force from a charging terminal, and caused to rotate and slide against the charging terminal, has been given as an example of a self-cleaning mechanism of a power supply terminal. In a modification, a configuration wherein a power supply terminal is caused to slide linearly utilizing a pressing force of a charging terminal may be adopted. For example, a configuration may be such that a leading end of a power supply terminal is a tapered face, and in accompaniment to a displacement in an axial line direction of a charging terminal, the power supply terminal is subjected to a force in a direction perpendicular to the axial line.

In the heretofore described embodiment, a member having an aspect like a backrest is provided as the back face panel 508 in the charging station 500, as shown in FIG. 9, whereby a performance as though the robot 100 is taking a break during charging is realized. In a modification, a member that depicts a background may be disposed as a back face panel. For example, a nest may be evoked by simulating a plant or the like. A situation wherein two robots 100 return to one nest and relax may be performed. By so doing, a notion of "robot charging" held by a user is diluted, and a sense of the robot 100 being alive can be increased. Also, multiple kinds of panel may be interchangeable in accordance with a season or the like, and an image caused to change appropriately. By adopting a common member as the fixing member 509, various forms of back face panel can be attached.

In the heretofore described embodiment, a thermosensor is the target of a calibration using the reference value providing unit 524. In a modification, another sensor included in the internal sensor 128, such as a distance measuring sensor or a form measuring sensor (a depth sensor), may be the target. The reference value providing unit 524 outputs a reference value of a sensor measurement target.

In the heretofore described embodiment, the leading end of the pin terminal 521 configuring the power supply terminal 520 is of a spherical form (a hemispherical form), but a flat form may be adopted. It is good when a complementary form is adopted for a connection face (contact face) on the charging terminal 510 side, by flattening or the like, in accordance with the form of the power supply terminal 520.

In the heretofore described embodiment, an aspect wherein the configuration of the terminal unit 55 is such that the magnet 558 is disposed in the center of the leading end portion, and the multiple of pin terminals 521 are disposed in the periphery thereof, as shown in FIGS. 14A to 14C, has been given as an example. In a modification, conversely, a power supply terminal (one power supply terminal or a pin terminal divided into a multiple) may be disposed in a center of a leading end portion, and a magnet disposed in a periphery or on both sides thereof. According to the disposition in the heretofore described embodiment, there is a possibility of contributing to a production of a design-related factor, such as the terminal unit appearing to have a button-like aspect when seen from the front.

In the heretofore described embodiment, an aspect wherein an end face of the charging terminal 510 on the robot 100 side is of a concave form and an end face of the power supply terminal 520 on the charging station 500 side is of a protruding form has been given as an example. In a modification, conversely, a configuration may be such that an end face of a charging terminal is of a protruding form, while an end face of a power supply terminal is of a concave form, and the two are of largely complementary forms. Note that as a concave face is less likely than a protruding face to become dirty or damaged in an aspect of normal use, a charging terminal on a robot side is preferably of a form having a concave face (including a concave spherical form) when there is a large amount of environmental change.

In the heretofore described embodiment, an example wherein the robot 100 is charged while remaining standing (the wheels remain advanced) has been shown. In a modification, charging may be carried out with a robot in a crouching state (with the wheels in a housed state). By so doing, behavior such as the robot sleeping is more easily expressed, and a performance-related advantage is obtained. Meanwhile, when considering that a robot is liable to generate heat due to high-speed charging, it is preferable that an interval between the wheels and the body 104 is formed by ejecting the wheels, thereby securing internal and external ventilation of the body 104.

In the heretofore described embodiment, an example wherein there is one wheel (the rear wheel 103) that rides up on the base 504 has been shown. In a modification, there may be two wheels. Specifically, a robot has four wheels, and two of these may be driven wheels formed of casters. Also, in the heretofore described embodiment, a wheel that rides up on the base 504 is a rear wheel of a robot, but this may be a front wheel. In this case, the rear wheel is a drive wheel, and the front wheel is a driven wheel.

In the heretofore described embodiment, an example wherein a wheel (the rear wheel 103) that rides up on the base 504 is a caster has been shown. A caster is such that an axle is offset rather than being on an axial line of a main shaft (a turning shaft) (that is, the caster has a trail). Because of the trail, a rolling of the wheel is easily caused to promptly follow a direction of travel. Because of this, the wheel is easily guided in a direction of a gravitational component following the three-dimensional curved form of the base 504. In other words, it can be said that the three-dimensional curved form effectively utilizes the properties of this kind of caster. In a modification, a wheel that is not a caster, that is, a wheel whose axle is positioned on an axial line of a main shaft (a turning shaft), may be employed. Even though not as advantageous as a caster, guiding that utilizes a gravitational component can be carried out.

In the heretofore described embodiment, a reference entrance line is of a straight form connecting a target position and a specific position on an entrance side in front (directly in front) of the target position. In a modification, a reference entrance line may be set in a straight form connecting an entrance side specific position, obliquely in front seen from a target position, and the target position. In particular, in a case wherein a multiple of robots can enter a charging station simultaneously, as in the heretofore described embodiment, interference between the robots can be prevented by separating the entrance side specific positions of the charging spaces. Also, when a base can be configured to be comparatively large, a curved portion may be included in a reference entrance line. That is, a "reference entrance line" need not necessarily be a straight line. An inclined face of a three-dimensional curved form, which provides an entering wheel with a gravitational component that acts toward a reference entrance line side, is to be included on the left and right of the reference entrance line on a base.

In the heretofore described embodiment, a configuration wherein only a rear wheel of a robot rides up on a base of a charging station has been given as an example. In a modification, a configuration wherein not only a rear wheel but also a front wheel rides up may be adopted. The same applies to a case wherein a robot rides up on a base from a front wheel. In this case, a flat portion on a base entrance side is increased in size. In particular, in a case wherein the base itself is lightweight and unstable, the base can be stabilized by placing the whole weight of the robot on the base. This is not especially necessary in the heretofore described embodiment, as the unit main body 512 has a sufficient weight.

Although not mentioned in the heretofore described embodiment, a temperature that rises during charging can be measured (monitored) in a charging station. The charging station includes a charging control unit that manages a charging state. The charging control unit may carry out charging control, such as restricting a power supply, when a measured temperature exceeds a preset upper limit temperature.

Although not mentioned in the heretofore described embodiment, a timing of carrying out charging of the battery 118 may be a timing at which a remaining charge drops to or below a set value. Alternatively, the timing may be set as a time (a schedule), such as every 45 minutes, regardless of the remaining charge.

What is claimed is:
1. A charging station comprising:
a base having an upper face for supporting a wheel of a robot, wherein the upper face includes a target position and an entrance side specific portion, and a reference entrance line connects the entrance side specific portion the target position; and
a power supply terminal configured to connect to a charging terminal of the robot when the wheel is in the target position;
an inverted face of a three-dimensional curved form on the upper face, wherein the inverted face is configured to bias the wheel toward the reference entrance line side; and
an axle bearing at the target position, wherein the axle bearing is configured to receive the wheel when a contact pressure acts between the charging terminal and the power supply terminal.
2. The charging station according to claim 1, wherein the inverted face of the three-dimensional curved form inclines in such a way as to become lower toward the reference entrance line on both sides of the reference entrance line.
3. The charging station according to claim 2, wherein the reference entrance line has an upward inclination and a downward inclination that are continuous from the entrance side specific position toward the target position, and
the upward inclination has a slope less than a slope of the downward inclination.

4. The charging station according to claim 3, wherein the slope of the upward inclination varies in a direction from the entrance side specific portion to the target portion.

5. The charging station according to claim 1, wherein a position of the power supply terminal is adjustable.

6. The charging station according to claim 5, wherein the power supply terminal is configured to magnetically connect to the charging terminal.

7. The charging station according to claim 1, comprising an adjuster for supporting the power supply terminal, wherein
the adjuster is configured to permit the power supply terminal to slide against the charging terminal using a biasing force exerted when the charging terminal connects to the power supply terminal.

8. The charging station according to claim 7, wherein the adjuster includes
a main body that extends toward an entrance side of the base, and
a terminal supporting portion that rotatable around an axial line of the main body.

9. The charging station according to claim 8, wherein the power supply terminal includes a plurality of terminals, and
each terminal of the plurality of terminals is in a periphery of the axial line.

10. The charging station according to claim 1, wherein the upper face of the base is sloped downward in a direction toward an entrance side of the base, and the upper face comprises a region having a fan shape.

11. A charging station comprising:
a base having an upper face for supporting a wheel of a robot, wherein a guide path on the upper face has an opening configured to guide the wheel toward a target position on a far side of the base from an entrance side of the base;
a power supply terminal configured to connect to a charging terminal of the robot; and
a support for supporting the power supply terminal, wherein
the support mechanism includes:
a rotary shaft in the base,
a supporting member below the guide path and pivotably centered on the rotary shaft, and
a pair of terminals supported on the supporting member, wherein each of the pair of terminals is capable of functioning as the power supply terminal.

12. The charging station according to claim 11, wherein each of the pair of terminals is slidable in a terminal connection direction.

13. The charging station according to claim 11, further comprising an inverted face of the three-dimensional curved form inclining toward the opening.

14. The charging station according to claim 11, wherein the upper face includes:
an upward inclination having a first slope, and
a downward inclination having a second slope, wherein a magnitude of the first slope is different from a magnitude of the second slope.

15. The charging station according to claim 14, wherein the downward inclination is between the upward inclination and target position.

16. The charging station according to claim 14, wherein the magnitude of the first slope is variable.

17. The charging station according to claim 11, wherein a first terminal of the pair of terminals is on an opposite side of the supporting member from a second terminal of the pair of terminals.

18. The charging station according to claim 11, wherein the support is closer to the entrance side of the base than the target position.

19. The charging station according to claim 11, wherein the pair of terminals are pivotable in unison.

\* \* \* \* \*